(12) United States Patent
Garrison

(10) Patent No.: US 11,686,206 B2
(45) Date of Patent: *Jun. 27, 2023

(54) CIRCUMFERENTIAL SEAL ASSEMBLY WITH ADJUSTABLE SEATING FORCES

(71) Applicant: Stein Seal Company, Kulpsville, PA (US)

(72) Inventor: Glenn M. Garrison, Perkiomenville, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,084

(22) Filed: Oct. 6, 2021

(65) Prior Publication Data

US 2022/0025777 A1 Jan. 27, 2022

Related U.S. Application Data

(63) Continuation of application No. 16/491,189, filed as application No. PCT/US2017/030834 on May 3, 2017, now Pat. No. 11,168,573.

(51) Int. Cl.
*F01D 11/00* (2006.01)
*F16J 15/24* (2006.01)
*F16J 15/44* (2006.01)

(52) U.S. Cl.
CPC ............ *F01D 11/003* (2013.01); *F16J 15/24* (2013.01); *F16J 15/442* (2013.01); *F05D 2220/32* (2013.01); *F05D 2240/55* (2013.01)

(58) Field of Classification Search
CPC ...... F16J 15/442; F16J 15/24; F05D 2240/55; F05D 2220/32
See application file for complete search history.

(56) References Cited

U.S. PATENT DOCUMENTS 3,912,342 A * 10/1975 Schirm ................. F16J 15/441
    384/131
5,039,115 A * 8/1991 Hebert ................. F16J 15/406
    277/580

(Continued)

OTHER PUBLICATIONS

Search Report dated Oct. 12, 2022 issued by the European Patent Office under Application No. 22187315.1 (6 pages).

*Primary Examiner* — Eugene G Byrd
(74) *Attorney, Agent, or Firm* — Michael Crilly, Esquire

(57) ABSTRACT

A circumferential seal assembly for use between a higher pressure side and a lower pressure side is presented. The seal assembly includes a primary sealing ring, a second sealing ring, a third sealing ring, and an insert. The segmented primary sealing ring sealingly engages both a face sealing surface along a housing and a radial sealing surface along a rotatable element. The insert is disposed within and directly contacts the housing. The second sealing ring is adjacent to the primary sealing ring and sealingly engages both the primary sealing ring and the insert. The segmented third sealing ring contacts and sealingly engages the primary sealing ring opposite the housing. The insert, the second sealing ring, and the third sealing ring cooperate to form a first cavity adjacent to the second sealing ring and the third sealing ring. The primary sealing ring, the second sealing ring, the insert, and the housing cooperate to form a second cavity adjacent to the primary sealing ring. The insert and the second sealing ring separate the first cavity from the second cavity.

49 Claims, 17 Drawing Sheets

(56) References Cited

U.S. PATENT DOCUMENTS

| | | | | |
|---|---|---|---|---|
| 5,058,904 | A | * | 10/1991 | Nevola .................... F16J 15/30 |
| | | | | 277/399 |
| 5,217,232 | A | * | 6/1993 | Makhobey ............... F16J 15/30 |
| | | | | 277/411 |
| 5,509,664 | A | * | 4/1996 | Borkiewicz ............ F16J 15/442 |
| | | | | 277/543 |
| 5,558,341 | A | * | 9/1996 | McNickle ............ F16J 15/3488 |
| | | | | 277/400 |
| 5,813,830 | A | * | 9/1998 | Smith .................... F16J 15/442 |
| | | | | 415/170.1 |
| 6,132,168 | A | * | 10/2000 | Kovaleski .............. F16J 15/443 |
| | | | | 415/113 |
| 6,692,006 | B2 | * | 2/2004 | Holder ................... F16J 15/442 |
| | | | | 277/346 |
| 7,931,277 | B2 | * | 4/2011 | Garrison ................ F16J 15/441 |
| | | | | 277/400 |
| 8,083,235 | B2 | * | 12/2011 | Azibert .................... F16J 15/54 |
| | | | | 277/371 |
| 9,551,232 | B2 | * | 1/2017 | Lebigre ................ F16J 15/3412 |
| 11,168,573 | B2 | * | 11/2021 | Garrison .................. F16J 15/24 |
| 11,434,828 | B2 | * | 9/2022 | Miller .................. F16J 15/3416 |
| 2010/0237566 | A1 | * | 9/2010 | Balsells ............... F16J 15/3236 |
| | | | | 277/637 |
| 2012/0261887 | A1 | | 10/2012 | Vasagar |
| 2013/0200573 | A1 | * | 8/2013 | Garrison .................... F16J 9/24 |
| | | | | 137/1 |
| 2015/0167846 | A1 | * | 6/2015 | Haynes .................... F16J 15/34 |
| | | | | 277/350 |
| 2016/0069269 | A1 | * | 3/2016 | Hyland .................. F16J 15/442 |
| | | | | 277/411 |

* cited by examiner

CIRCUMFERENTIAL SEAL ASSEMBLY WITH ADJUSTABLE SEATING FORCES

CROSS REFERENCE TO RELATED APPLICATIONS

This application is a continuation of U.S. patent application Ser. No. 16/491,189 filed Sep. 5, 2019 entitled Improved Circumferential Seal Assembly with Adjustable Seating Forces which is a National Stage entry of PCT Application No. PCT/US2017/030834 filed May 3, 2017 entitled Improved Circumferential Seal Assembly with Adjustable Seating Forces wherein both applications are hereby incorporated herein in their entirety by reference thereto.

GOVERNMENT SPONSORED RESEARCH AND DEVELOPMENT

None.

BACKGROUND OF THE INVENTION

1. Field

The invention generally relates to a circumferential seal assembly for controlling flow of a fluid between adjoining compartments within a turbine engine and more particularly is concerned, for example, with minimizing flow across a sealing surface along a rotatable shaft or a runner that extends into one compartment with a fluid at a higher pressure and into another compartment with another fluid at a lower pressure.

2. Background

A turbine engine typically includes a housing that defines compartments therein and a rotatable shaft with or without a runner that passes through the compartments. Adjoining compartments typically separate one fluid from another fluid. In one example, one compartment may include a gas, such as combustion byproducts, and another may include a liquid, such as a lubricant. Mixture between the liquid and the gas within one compartment could compromise the integrity of the sealing assembly thereby adversely effecting performance and function of a gas turbine. As such, adjoining compartments must be isolated from one another by means of a sealing system that prevents one fluid, either a liquid or a gas, from migrating along a rotatable surface and entering a compartment so as to mix with another fluid therein. A circumferential seal is often implemented to avoid mixing between fluids and the problems caused thereby.

Referring now to FIG. 1, an exemplary circumferential seal 1 known within the art is shown with a garter spring 2 disposed within a groove 23 about the circumference of the circumferential seal 1 and a coil spring 8 disposed within a pocket 24 at one side of the circumferential seal 1. A typical circumferential seal 1 is composed of two or more ring segments with coil springs 8 and pockets 24 along each segment. The circumferential seal 1 is situated between a higher pressure side 21 at a higher pressure $P_1$ and a lower pressure side 22 at a lower pressure $P_0$. The garter spring 2 urges the circumferential seal 1 in the direction of a radial sealing surface 19. The radial sealing surface 19 may be disposed along the outer circumference of a shaft or a component attached to a shaft, one non-limiting example of the latter being a runner. The coil spring 8 urges the circumferential seal 1 in the direction of a forward sealing surface 11 disposed along the interior of a housing (not shown) adjacent to the circumferential seal 1.

A forward face 3 of the circumferential seal 1 may sealingly engage the forward sealing surface 11 via cooperation between a radial bleed groove 4, a face groove 5, and a face dam 6. A forward pressure 7 is communicated across the forward face 3 via a fluid contacting the circumferential seal 1. The forward pressure 7 imparts a forward face force $F_F$ in the direction of the higher pressure side 21.

An aft pressure 10 is communicated across an aft face 9 via a fluid contacting the circumferential seal 1. The aft pressure 10 imparts an aft face force $F_A$ in the direction of the lower pressure side 22. The coil spring 8 also imparts a spring force $F_S$ directed toward the lower pressure side 22.

The total of the aft face force $F_A$ and the spring force $F_S$ is greater than or equal to the forward face force $F_F$ so that the forward face 3 contacts and sealingly engages the forward sealing surface 11. In preferred embodiments, the force differential should be minimized to permit inward and outward movement of ring segments so that the circumferential seal 1 contracts and expands as required by conditions within a turbine engine.

An inward pressure 14 is communicated across an outer circumferential surface 12 via a fluid contacting the circumferential seal 1. The inward pressure 14 imparts an inward radial force $F_I$ in the direction of the radial sealing surface 19. The garter spring 2 also imparts a spring force $F_G$ directed toward the radial sealing surface 19.

An inner circumferential surface 13 of the circumferential seal 1 may sealingly engage the radial sealing surface 19 via cooperation between a seal dam 15, a bore groove 16, and an axial bleed groove 17. The seal dam 15 is biased toward the lower pressure side 22. An outward pressure 18 is communicated across the inner circumferential surface 13 via a fluid contacting the circumferential seal 1. The outward pressure 18 imparts an outward radial force $F_O$ in the direction away from the radial sealing surface 19.

The total of the inward radial force $F_I$ and the spring force $F_G$ should be greater than or equal to the outward radial force $F_O$ so that the inner circumferential surface 13 sealingly engages the radial sealing surface 19, preferably via a thin film 20. In other preferred embodiments, the force differential should be minimized to permit inward and outward movement of ring segments so that the circumferential seal 1 contracts and expands as required by conditions within a turbine engine.

Performance and efficiency enhancements to turbine engines often require higher pressures and temperatures within the higher pressure side 21 and higher rotational speeds by the shaft and the radial sealing surface 19 thereon. High pressure and temperatures are problematic in that it is more challenging to properly balance the forward face force $F_F$ with respect to both the aft face force $F_A$ and the spring force $F_S$ and both the inward radial force $F_I$ and the spring force $F_G$ with respect to the outward radial force $F_O$ over a wider range of operating conditions.

For example, a circumferential seal 1 optimized for pressures and temperatures during flight may allow the aft face force $F_A$ to greatly exceed the forward face force $F_F$ and/or the inward radial force $F_I$ to greatly exceed the outward radial force $F_O$ when engine conditions require higher shaft speeds and pressures, such as at takeoff. The resulting imbalance effectively pins the circumferential seal 1 onto and against the face sealing surface 11 and the radial sealing surface 19 causing excessive wear to and heating of the circumferential seal 1.

Wear and heating are further problematic in turbine engines that derive greater performance and higher efficiency via higher shaft speeds. At extreme conditions, a circumferential seal 1 may permit hot gases from the higher pressure side 21 to freely flow into the lower pressure side 22 so as to mix with and to cook oil lubricants therein. The end results could include an engine fire and/or flow conditions in the direction of the sump that blow lubricating oil away from the seal and the sealing surface.

Accordingly, what is required is a circumferential seal assembly interposed between a pair of compartments that minimizes leakage across a face sealing surface and a radial sealing surface within a turbine engine operating at higher shaft speeds and pressures.

Accordingly, what is also required is a circumferential seal assembly that reduces seating forces along a face sealing surface and a radial sealing surface within a turbine engine operating at higher shaft speeds and pressures.

SUMMARY OF THE INVENTION

An object of the invention is to provide a circumferential seal assembly interposed between a pair of compartments that minimizes leakage across a face sealing surface and a radial sealing surface within a turbine engine operating at higher shaft speeds and pressures.

Another object of the invention is to provide a circumferential seal assembly that reduces seating forces along a face sealing surface and a radial sealing surface within a turbine engine operating at higher shaft speeds and pressures.

In accordance with embodiments of the invention, the circumferential seal assembly includes a primary sealing ring, an insert, a second sealing ring, and a third sealing ring. The primary sealing ring is disposed within a housing along a rotatable element. The primary sealing ring sealingly engages both a face sealing surface along the housing and a radial sealing surface along the rotatable element. The primary sealing ring includes at least two seal segments. The insert is disposed within and directly contacts the housing. The second sealing ring is adjacent to the primary sealing ring. The second sealing ring sealingly engages the primary sealing ring and the insert. The third sealing ring contacts and sealingly engages the primary sealing ring opposite of sealing engagement with the housing. The third sealing ring includes at least two ring segments. The insert, the second sealing ring, and the third sealing ring define a first cavity adjacent to the second sealing ring and the third sealing ring. The primary sealing ring, the second sealing ring, the insert, and the housing define a second cavity adjacent to the primary sealing ring. The insert and the second sealing ring separate the first cavity from the second cavity.

In accordance with other embodiments of the invention, the rotatable element is a shaft.

In accordance with other embodiments of the invention, the rotatable element is a runner disposed along a shaft.

In accordance with other embodiments of the invention, the first cavity is at a higher pressure and the second cavity is at a lower pressure.

In accordance with other embodiments of the invention, the primary sealing ring includes a seal bore dam biased toward the third sealing ring and the seal bore dam sealingly engages the radial sealing surface.

In accordance with other embodiments of the invention, the fluid traverses the radial sealing surface adjacent to the third sealing ring before entering the primary sealing ring.

In accordance with other embodiments of the invention, the seal segment includes at least one vertical feed groove disposed along an inlet side and at least one substantially horizontal first channel that traverses the seal segment between the inlet side and an outlet side so that the vertical feed groove and the first channel permit a fluid originating from the higher pressure side to traverse the seal segment so as to impinge the face sealing surface.

In accordance with other embodiments of the invention, the seal segment includes at least one pocket at the outlet side communicable with at least one first channel.

In accordance with other embodiments of the invention, the seal segment includes at least one second channel communicable at one end with the pocket so that the second channel permits the fluid to reenter the seal segment for communication at another end of the second channel onto the radial sealing surface.

In accordance with other embodiments of the invention, a plurality of hydrodynamic grooves is disposed along the radial sealing surface adjacent to the primary sealing ring so that the hydrodynamic grooves redirect the fluid exiting the second channel onto the primary sealing ring.

In accordance with other embodiments of the invention, the seal segment includes at least one vent channel communicable at one end with the radial sealing surface and at another end with the second cavity so that the vent channel permits the fluid to traverse the seal segment before entering the second cavity.

In accordance with other embodiments of the invention, a plurality of hydrodynamic grooves are disposed along the radial sealing surface adjacent to the primary sealing ring so that the hydrodynamic grooves direct the fluid onto the primary sealing ring.

In accordance with other embodiments of the invention, the seal segment includes at least one vent channel communicable at one end with a gap interposed between the seal segment and the radial sealing surface and at another end with the second cavity so that the vent channel permits the fluid to traverse the seal segment and enter the second cavity.

In accordance with other embodiments of the invention, the housing includes at least one exhaust port that permits the fluid to exit the second cavity.

In accordance with other embodiments of the invention, a gap is interposed between the second sealing ring and the third sealing ring.

In accordance with other embodiments of the invention, a fluid originating from the higher pressure side traverses the first cavity and passes around the second sealing ring before entering the second cavity.

In accordance with other embodiments of the invention, the seal segment includes a vertical flange at one end of a horizontal flange so that the vertical flange sealingly engages the face sealing surface.

In accordance with other embodiments of the invention, a resultant pressure force along the face sealing surface increases when a radial height of the vertical flange is reduced by a radial adjustment.

In accordance with other embodiments of the invention, a resultant pressure force along the face sealing surface decreases when a radial height of the vertical flange is increased by a radial adjustment.

In accordance with other embodiments of the invention, a resultant pressure force along the radial sealing surface increases when the second sealing ring is adjusted toward the lower pressure side.

In accordance with other embodiments of the invention, a resultant pressure force along the radial sealing surface decreases when the second sealing ring is adjusted away from the lower pressure side.

In accordance with other embodiments of the invention, the radial sealing surface is disposed along an outer circumferential surface of the rotatable element.

In accordance with other embodiments of the invention, the radial sealing surface is disposed along an inner circumferential surface of the rotatable element.

In accordance with other embodiments of the invention, the third sealing ring is comprised of a metal and biased in the direction of the primary sealing ring via a spring. The spring is disposed between and directly contacts the third sealing ring and a retaining ring secured to the housing. An annular gap is disposed between the third sealing ring and the rotatable element.

In accordance with other embodiments of the invention, the primary sealing ring is biased outward in the direction of the rotatable element via a plurality of springs.

In accordance with other embodiments of the invention, the insert is integral with the housing.

Several exemplary advantages are possible. The invention facilitates circumferential sealing which minimizes wear along a face sealing surface, between a primary sealing ring and a housing, and along a radial sealing surface, between a primary sealing ring and a rotating shaft or runner. The invention facilitates circumferential sealing which minimizes heating along a radial sealing surface between a primary sealing ring and a rotating shaft or runner. The invention minimizes contact forces thereby reducing oil coolant requirements along a radial sealing surface between a primary sealing ring and a rotating shaft or runner. The invention reduces contact forces thereby reducing or eliminating coolant needs along a radial sealing surface between a primary sealing ring comprising ceramic and a rotating shaft or runner. Hydrostatic embodiments provide a self-adjusting force balance at the radial sealing surface.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Figure 1:
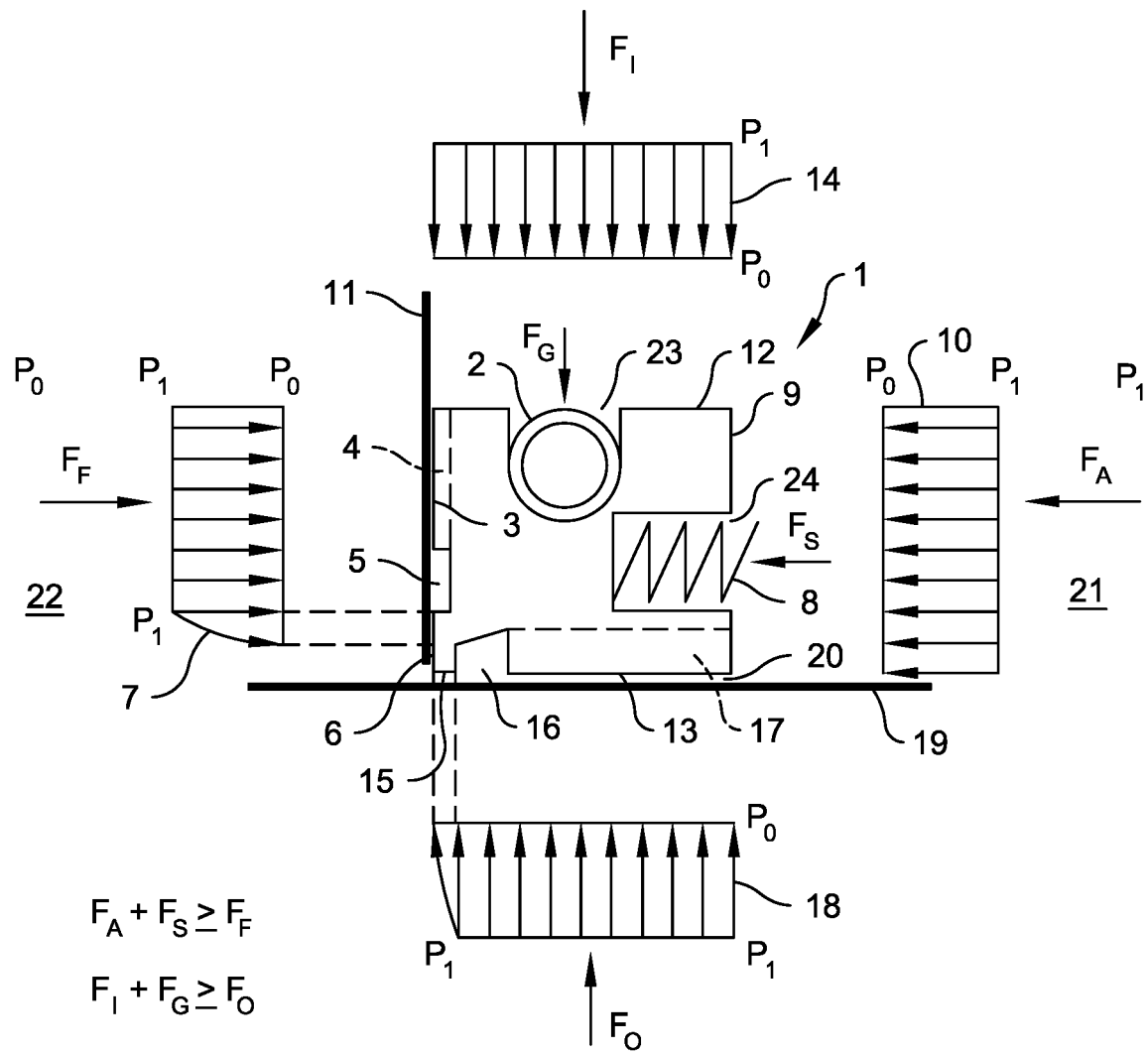
FIG. 1 is an enlarged cross-section view illustrating a circumferential seal from the prior art with exemplary pressure profiles and resultant forces thereon (housing components disposed about the seal not shown).

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described, it is understood that such features are combinable to form other embodiments.

Figure 2:
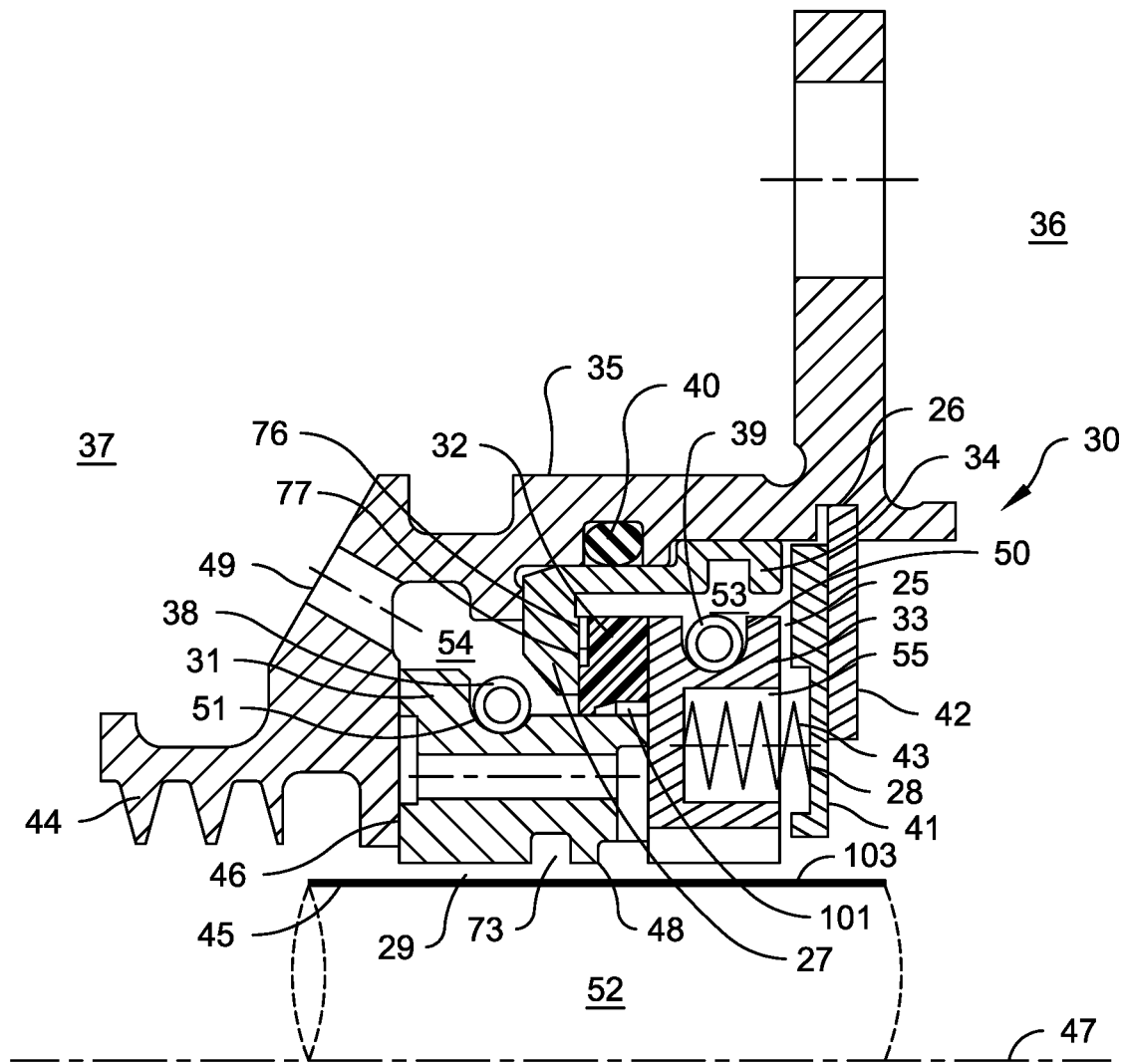
FIG. 2 is an enlarged cross-section view illustrating an improved circumferential seal assembly including a primary sealing ring, a second sealing ring, a third sealing ring, and an insert disposed within a housing whereby the primary sealing ring, the second sealing ring, the insert and the housing are arranged to define a cavity disposed directly about the primary sealing ring and the second sealing ring, the third sealing ring and the insert are arranged to define another cavity disposed directly about the second sealing ring and the third sealing ring in accordance with an embodiment of the invention.

Referring now to FIG. 2, a circumferential seal assembly 30 is shown disposed within a housing 35 about a rotatable element 52. The circumferential seal assembly 30 generally comprises a primary sealing ring 31, a second sealing ring 32, a third sealing ring 33, and an insert 34. Components for the circumferential seal assembly 30 are secured within the housing 35 preferably via securing means understood in the art, non-limiting examples including a back plate 41 and a retaining ring 42. Components of the circumferential seal assembly 30 are composed of materials suitable for the intended applications, examples including but not limited to metals, ceramics, and non-metals, one further non-limiting example of the latter being carbon.

Referring again to FIG. 2, the circumferential seal assembly 30, housing 35, and rotatable element 52 are aligned along and disposed about a rotational axis 47, often coinciding with the rotational axis within a turbine engine. The rotatable element 52 is broadly defined to include a rotatable shaft or the like with or without elements extending therefrom, one non-limiting example of the latter being a runner.

Referring again to FIG. 2, the circumferential seal assembly 30, housing 35, and rotatable element 52 generally cooperate to define and separate a higher pressure side 36 and a lower pressure side 37. The housing 35 is attached to structural components (not shown) of a turbine engine via methods understood in the art so as to secure the circumferential seal assembly 30 therein. In this arrangement, the circumferential seal assembly 30 and housing 35 are non-rotating. The configuration of the housing 35 is design dependent; however, it is understood for purposes of the present invention that the housing 35 cooperates with the circumferential seal assembly 30 and the rotatable element 52 to define two separate compartments whereby one fluid, such as a lubricant, resides at a lower pressure within a compartment coinciding with the lower pressure side 37 and another fluid, such as a gas, resides at a higher pressure within a compartment coinciding with the higher pressure side 36.

Referring again to FIG. 2, the primary sealing ring 31 is disposed within the housing 35 so as to sealingly engage the rotatable element 52 along an outer surface thereof over a region referred to as the radial sealing surface 45. While the radial sealing surface 45 is shown along the outer circumferential surface 103 of the rotatable element 52, it is understood that the radial sealing surface 45 may be disposed along the inner diameter of a rotatable element 52 in other embodiments of the invention. The primary sealing ring 31 also sealingly engages an inside surface along the housing 35 over a region referred to as a face sealing surface 46 adjacent to the lower pressure side 37. It is further understood that the face sealing surface 46 may be adjacent to an optional windback 44 which extends from the housing 35 into the lower pressure side 37. Sealing engagement is generally understood to mean a non-contact arrangement and/or a contact arrangement that limits, prevents, or controls the flow of fluids between the higher pressure side 36 and the lower pressure side 37. In preferred embodiments, sealing engagement may be implemented via a thin-film fluid layer. In one specific example, the thin-film layer may be disposed along a gap 29 between the primary sealing ring 31 and the rotatable element 52.

Referring again to FIG. 2, the primary sealing ring 31 has an outer surface and an inner surface. The outer circumferential surface of the primary sealing ring 31 includes a spring groove 51. The spring groove 51 accepts a garter spring 38 which urges or biases the primary sealing ring 31 in the direction of the radial sealing surface 45. The inner circumferential surface of the primary sealing ring 31 includes a seal bore dam 48 and an annular groove 73. In preferred embodiments, the seal bore dam 48 is biased toward the third sealing ring 33 and away from the housing 35.

Referring again to FIG. 2, the insert 34 directly contacts a portion of the inner surface of the housing 35. The insert 34 is a ring-shaped element configured to contact and thereby to be securable within the housing 35. A portion of the insert 34 forms an inward flange 27 configured to extend toward but not contact the primary sealing ring 31. An O-ring 40 is positioned between the housing 35 and the insert 34 so as to prevent fluid from completely traversing the interface therebetween.

Referring again to FIG. 2, the second sealing ring 32 is positioned about the primary sealing ring 31 and adjacent to the inward flange 27. The second sealing ring 32 sealingly engages a portion of the outer circumferential surface of the primary sealing ring 31. The second sealing ring 32 also sealingly engages a portion of a face of the inward flange 27. The second sealing ring 32 extends below the end of the inward flange 27 so as to contact the outer circumferential surface of the primary sealing ring 31.

Referring again to FIG. 2, the third sealing ring 33 is positioned so as to overlay one side of the primary sealing ring 31 and the second sealing ring 32. The third sealing ring 33 is biased toward the primary sealing ring 31 via a plurality of compression springs 43. Each compression spring 43 is secured at one end within a pocket 55 along the third sealing ring 33 and at another end within a pocket 28 along the back plate 41. In preferred embodiments, the compression spring 43 ensures contact between the primary sealing ring 31 and the third sealing ring 33 and biases the primary sealing ring 31 toward the face sealing surface 46. This arrangement may or may not permit contact between the third sealing ring 33 and the second sealing ring 32. The outer circumferential surface of the third sealing ring 33 further includes a spring groove 50. The spring groove 50 accepts a garter spring 39 which urges or biases the third sealing ring 33 in the direction of the radial sealing surface 45.

Referring again to FIG. 2, the housing 35 includes a groove 26 which accepts the retaining ring 42. The back plate 41 is a ring-shaped element disposed between the retaining ring 42 and the third sealing ring 33. The compression spring 43 secures the back plate 41 to the retaining ring 42 by pushing the back plate 41 into contact with the retaining ring 42. In this arrangement, the compression spring 43 should remain sufficiently compressible so that the third sealing ring 33 and the primary sealing ring 31 are movable toward the back plate 41 in response to pressure forces at the face sealing surface 46. A gap 25 is provided between the back plate 41 and the third sealing ring 33 to accommodate axial displacements of the primary sealing ring 31 and the third sealing ring 33 thereby permitting further compression of the compression spring 43.

Referring again to FIG. 2, the insert 34, the second sealing ring 32, and the third sealing ring 33 are configured to cooperate to surround a region referred to as a first cavity 53. The first cavity 53 is communicable with the higher pressure side 36 via the gap 25. The gap 25 permits exchange of fluid between the first cavity 53 and the higher pressure side 36.

Referring again to FIG. 2, the primary sealing ring 31, the second sealing ring 32, the insert 34, and the housing 35 are configured to cooperate to enclose a region referred to as a second cavity 54. The second cavity 54 is communicable with the lower pressure side 37 via at least one exhaust port 49 along the housing 35. The exhaust port 49 is a hole disposed through the housing 35 which permits exchange of fluid between the second cavity 54 and the lower pressure side 37.

Referring again to FIG. 2, the second sealing ring 32 and the insert 34 are disposed between the first cavity 53 and the second cavity 54. This arrangement ensures separation between the first cavity 53 and the second cavity 54 thereby preventing fluids originating in the higher pressure side 36 from bypassing and negating the sealing function of the circumferential seal assembly 30. However, it is understood that fluid may slowly bleed across the interface formed between the second sealing ring 32 and each of the primary sealing ring 31, the third sealing ring 33, and the insert 34.

Figure 3A:
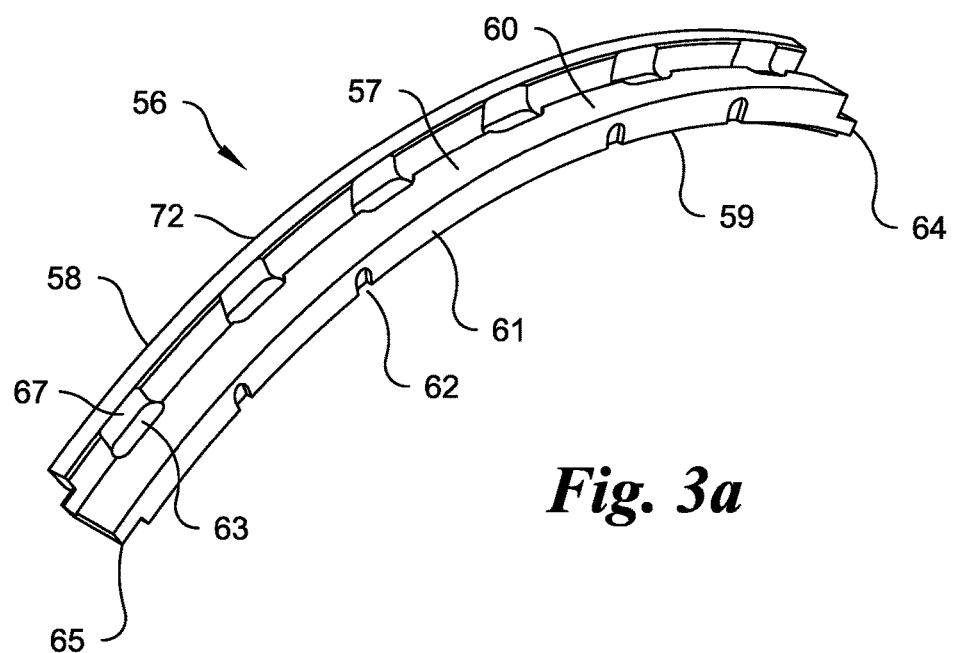
FIG. 3a is a perspective view illustrating a seal segment comprising a primary sealing ring whereby the seal segment includes a vertical feed groove and an optional vent channel with outlet end adjacent to a vertical groove in accordance with an embodiment of the invention.

Referring now to FIG. 3a, the primary sealing ring 31 in FIG. 2 is comprised of two or more seal segments 56 which in combination form a ring-shaped structure referred to as a segmented ring. Each seal segment 56 includes a vertical flange 58 at one end of a horizontal flange 57. This arrangement defines a generally L-shaped cross section for the seal segment 56. The vertical flange 58 extends in an outward radial direction from the horizontal flange 57. The vertical flange 58 and the horizontal flange 57 are curved so as to form a ring-shaped vertical flange 58 and a ring-shaped horizontal flange 57 when two or more seal segments 56 are combined. A first end 64 and a second end 65 of the seal segment 56 may include features facilitating an interlocking engagement between adjoining seal segments 56. In some embodiments, the interlock may be implemented by a tongue and a groove arrangement such as in FIG. 3a; however, it is understood that other interlocking means are also applicable to the invention as generally illustrated by the first end 64 and the second end 65 in FIGS. 3b-3d.

Referring again to FIG. 3a, the seal segment 56 includes an inlet side 61 and an outlet side 72. The inlet side 61 is disposed along the horizontal flange 57 opposite of the vertical flange 58. The inlet side 61 is oriented toward the higher pressure side 36 in FIG. 2. An outlet side 72 is disposed along the vertical flange 58 opposite the horizontal flange 57. The outlet side 72 is oriented toward the lower pressure side 37 in FIG. 2. At least one vertical feed groove 62 extends across a portion of the inlet side 61 from the inner surface 59. At least one vent channel 63 extends into the seal segment 56 from the outer surface 60 adjacent to the intersection between the horizontal flange 57 and the vertical flange 58. A vertical groove 67 is positioned along the vertical flange 58 and is aligned with the vent channel 63.

Figure 3B:
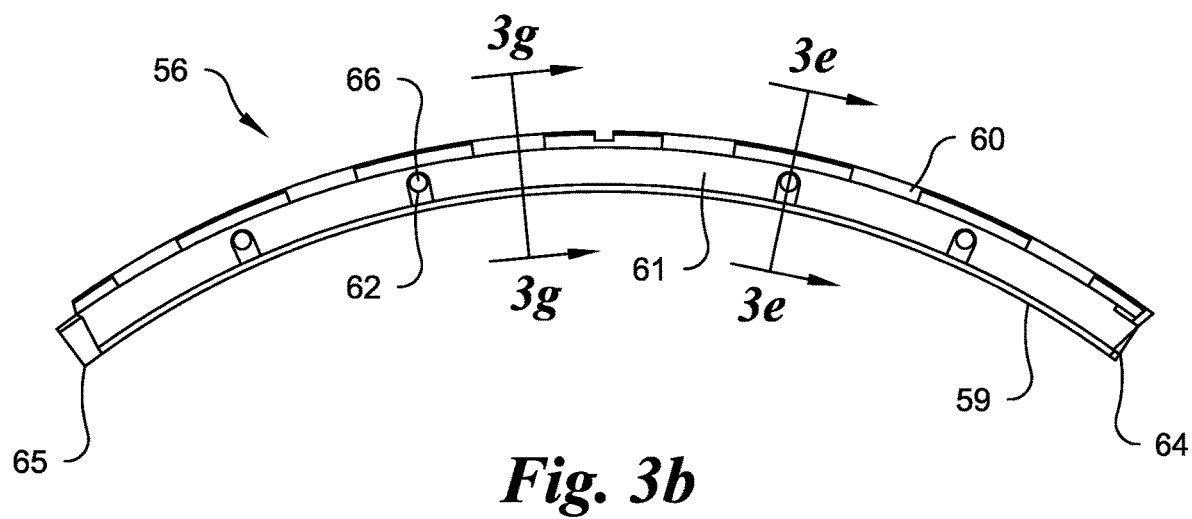
FIG. 3b is a side view illustrating an inlet side of the seal segment whereby the vertical feed groove is disposed about the inlet end of a first channel in accordance with an embodiment of the invention.
Figure 3C:
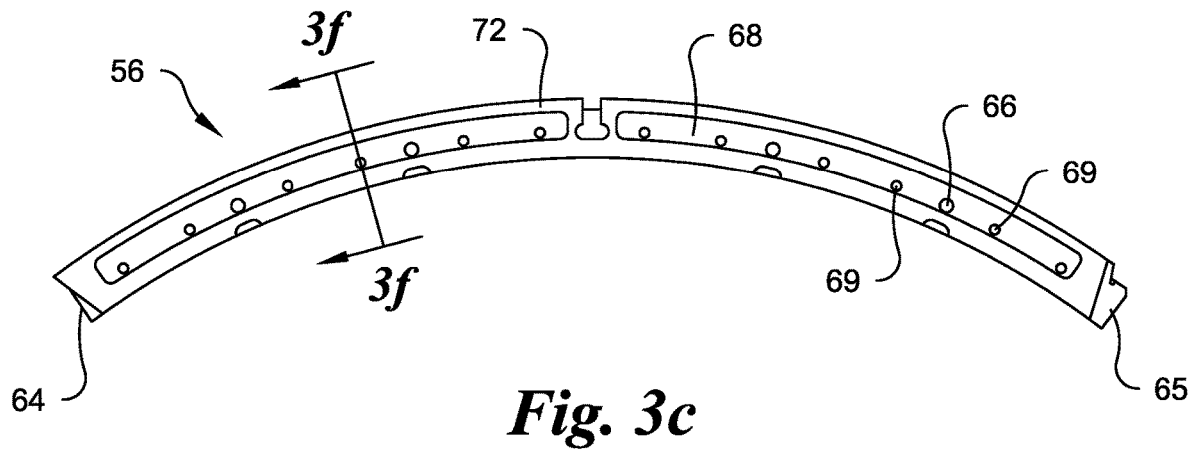
FIG. 3c is a side view illustrating an outlet side of the seal segment whereby an optional pocket is disposed about the outlet end of the first channel and the inlet end to an optional second channel in accordance with an embodiment of the invention.

Referring now to FIGS. 3b and 3c, the vertical feed groove 62 extends outward from the inner surface 59 in the direction of the outer surface 60. The vertical feed groove 62 intersects one end of a first channel 66 at the inlet side 61. Another end of the first channel 66 intersects the outlet side 72. In preferred embodiments, the outlet side 72 has a pocket 68 that intersects the first channel 66. At least one optional second channel 69 may extend into the seal segment 56 from the outlet side 72, preferably intersecting the pocket 68. The number, arrangement, and size of the first channel 66 and the second channel 69 are design dependent based on the flow requirements at the radial sealing surface 45 and the face sealing surface 46.

Figure 3D:
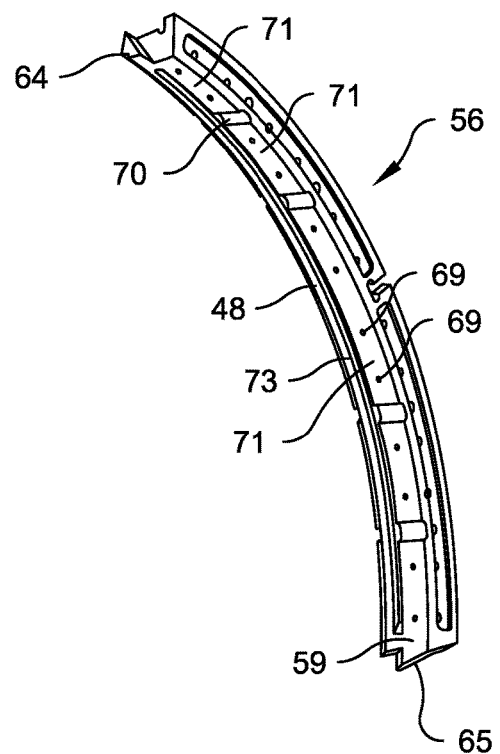
FIG. 3d is a perspective view illustrating the outlet end of the second channel, the inlet end of the optional vent channel, and optional bore and annular grooves and seal bore dam along the bore surface of the seal segment in accordance with an embodiment of the invention.

Referring now to FIG. 3d, the inner surface 59 of the seal segment 56 may include features which facilitate sealing along the radial sealing surface 45. For example, the outlet of the second channel 69 may intersect the inner surface 59, preferably at a pad 71. In another example, a bore groove 70 may be interposed between adjoining pads 71. The bore groove 70 may also intersect the annular groove 73, the latter interposed between the pads 71 and the seal bore dam 48. The arrangement between bore grooves 70 and annular groove 73 permits fluid from the lower pressure side 37 to pass under the seal segment 56.

Figure 3E:
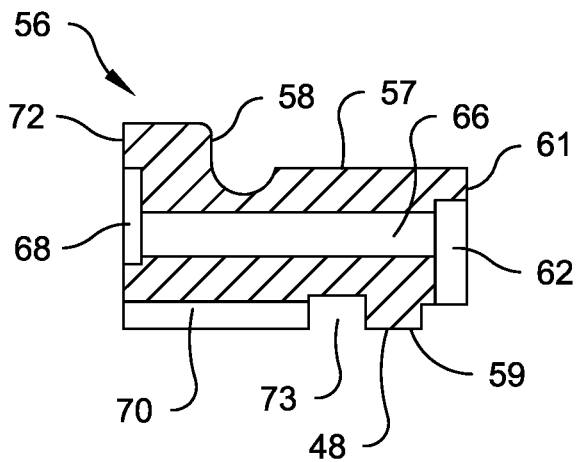
FIG. 3e is an enlarged cross-cross section view illustrating the pathway permitting fluid to flow from the inlet side to the outlet side of the seal segment whereby the pathway is formed by the vertical feed groove, the first channel, and the pocket in accordance with an embodiment of the invention.

Referring now to FIG. 3e, vertical feed groove 62, first channel 66, and pocket 68 are contiguous so as to form a pathway across the seal segment 56 between the inlet side 61 and the outlet side 72. The seal bore dam 48 is interposed between the vertical feed groove 62 and the annular groove 73. The bore groove 70 and the annular groove 73 are contiguous so as to form a pathway along the inner surface 59 across the vertical flange 58 and a portion of the horizontal flange 57.

Figure 3F:
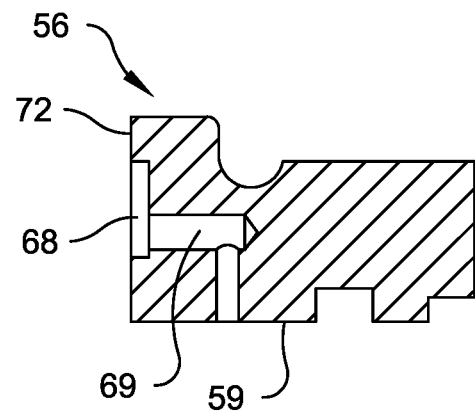
FIG. 3f is an enlarged cross-section view illustrating the pathway permitting fluid to flow from the outlet side to the inner surface of the seal segment whereby the pathway is formed by the pocket and the second channel in accordance with an embodiment of the invention.

Referring now to FIG. 3f, pocket 68 and second channel 69 are contiguous so as to form a pathway across the seal segment 56 between the outlet side 72 and the inner surface 59. Although the second channel 69 is shown composed of intersecting linear segments, it is understood that the second channel 69 may consist of one or more linear or nonlinear cavities that permit flow of a fluid from the outlet side 72 to the inner surface 59. While the first channel 66 and the second channel 69 may communicate with the same pocket 68, each of the first channel 66 and the second channel 69 is separately disposed within the seal segment 56. Therefore, it is understood that the arrangement of the first channel 66 in FIG. 3e and the second channel 69 in FIG. 3f permits a fluid to pass through the first channel 66 before exiting into the pocket 68 where the fluid is then redirected into and through the second channel 69.

Figure 3G:
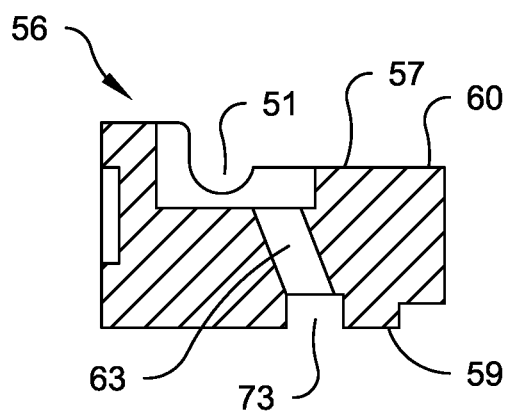
FIG. 3g is an enlarged cross-section view illustrating the pathway permitting fluid to flow from the inner surface to the outer surface of the seal segment whereby the pathway is formed by the vent channel in accordance with an embodiment of the invention.

Referring now to FIG. 3g, a vent channel 63 forms a pathway across the horizontal flange 57 of the seal segment 56 from the inner surface 59 to the outer surface 60. In preferred embodiments, one end of the vent channel 63 may intersect the annular groove 73 and the other end may intersect the outer surface 60 adjacent to the spring groove 51. The vent channel 63 facilitates venting of fluid otherwise communicated onto the radial sealing surface 45. For example, the vent channel 63 permits fluid communicated onto the inner surface 59 via the second channel 69 or via the bore groove 70 into the annular groove 73 to traverse the seal segment 56 before entering the second cavity 54.

Figure 4A:
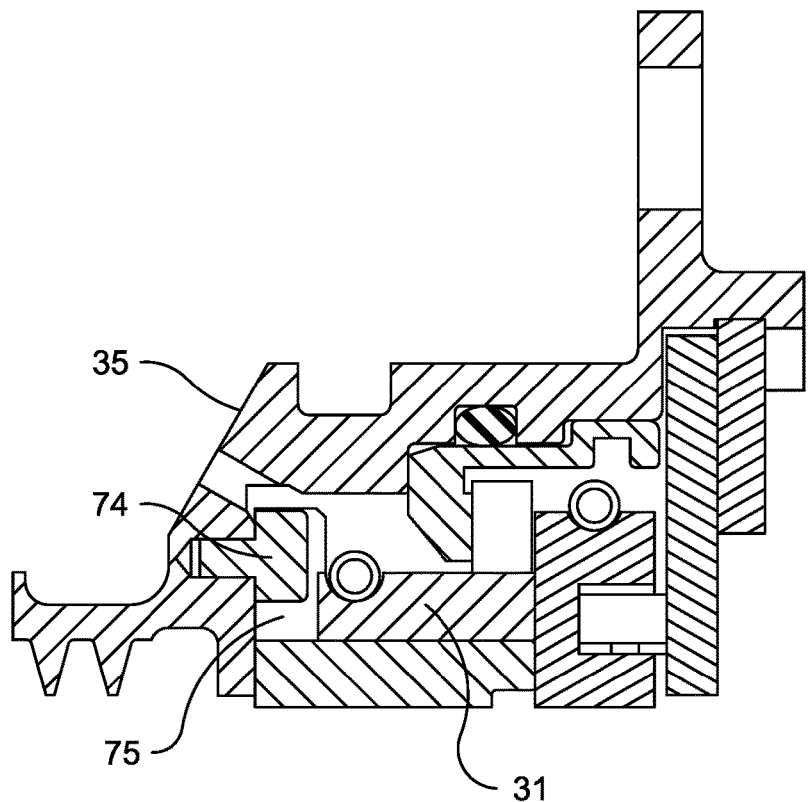
FIG. 4a is an enlarged cross-section view illustrating an anti-rotation pin extending into a pocket along the primary sealing ring in accordance with an embodiment of the invention.
Figure 4B:
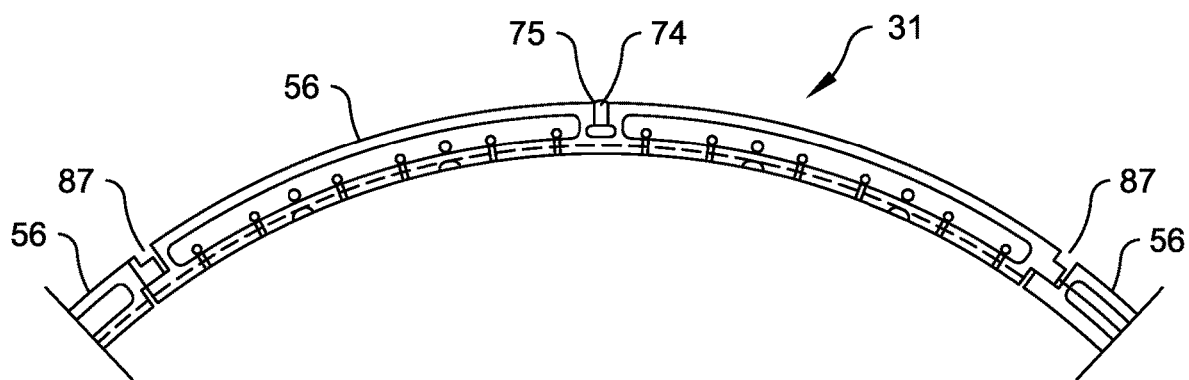
FIG. 4b is a side view illustrating several seal segments of the primary sealing ring with the anti-rotation pin extending into a pocket along one seal segment in accordance with an embodiment of the invention.

Referring now to FIGS. 4a and 4b, at least one anti-rotation pin 74 may be disposed within the housing 35. The anti-rotation pin 74 is secured to the housing 35 via threaded or press fit engagement and positioned so as to extend into the housing 35 adjacent to the primary sealing ring 31. The anti-rotation pin 74 extends into a pocket 75 disposed along a seal segment 56. The anti-rotation pin 74 mechanically engages the seal segment 56 at the pocket 75 so as to prevent relative rotational motion between the primary sealing ring 31 and the housing 35. The pocket 75 may be positioned along the seal segment 56 as shown in FIG. 4b or positioned at or adjacent to a joint 87 between adjoining seal segments 56.

Figure 5:
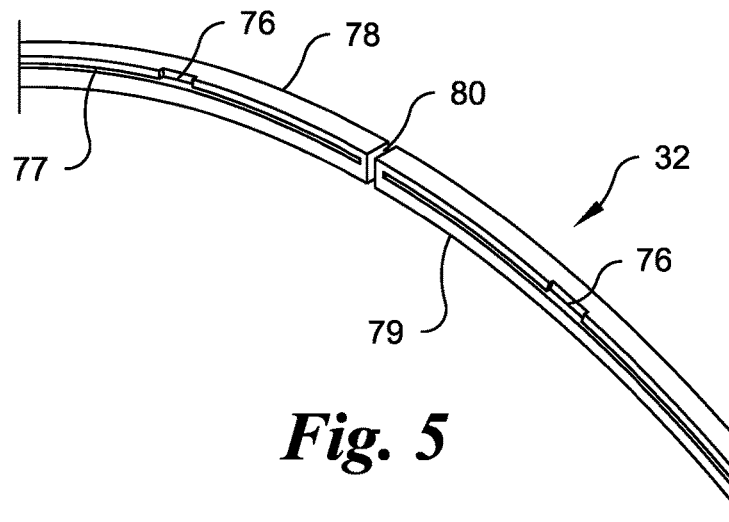
FIG. 5 is a perspective view illustrating a joint and optional face and feed grooves along the second sealing ring in accordance with an embodiment of the invention.

Referring now to FIG. 5, the second sealing ring 32 is preferred to be a contiguous ring-shaped element with a single gap 80. The contiguousness of the second sealing ring 32 restricts fluid from passing between joints along the otherwise segmented third sealing ring 33. The gap 80 facilitates expansion of the second sealing ring 32 during assembly onto and disassembly from other components comprising the circumferential seal assembly 30. The higher pressure side 78 of the second sealing 32 may contact or nearly contact the third sealing ring 33, the latter illustrated by the gap 88 in FIG. 9. The gap 88 may be sized to the maximum wear along the primary sealing ring 31 at the face sealing surface 46 over the anticipated lifetime of the primary sealing ring 31. In some embodiments, the second sealing ring 32 may sealingly engage the third sealing ring 33.

Referring again to FIG. 5, it may be advantageous in some embodiments for the second sealing ring 32 to further include a face groove 77 communicable with one or more feed grooves 76 at the lower pressure side 79. The face groove 77 and feed groove 76 may be positioned along the interface between the insert 34 and the second sealing ring 32, as shown in FIG. 2. This arrangement permits fluid within the first cavity 53 to flow in the face groove 77 via the feed groove(s) 76 so as to enhance sealing engagement between the insert 34 and the second sealing ring 32. It may also be advantageous to provide one or more pockets 101 along the inner circumferential surface of the second sealing ring 32, as generally represented in FIG. 2, to enhance sealing at the interface with the primary sealing ring 31.

Figure 6A:
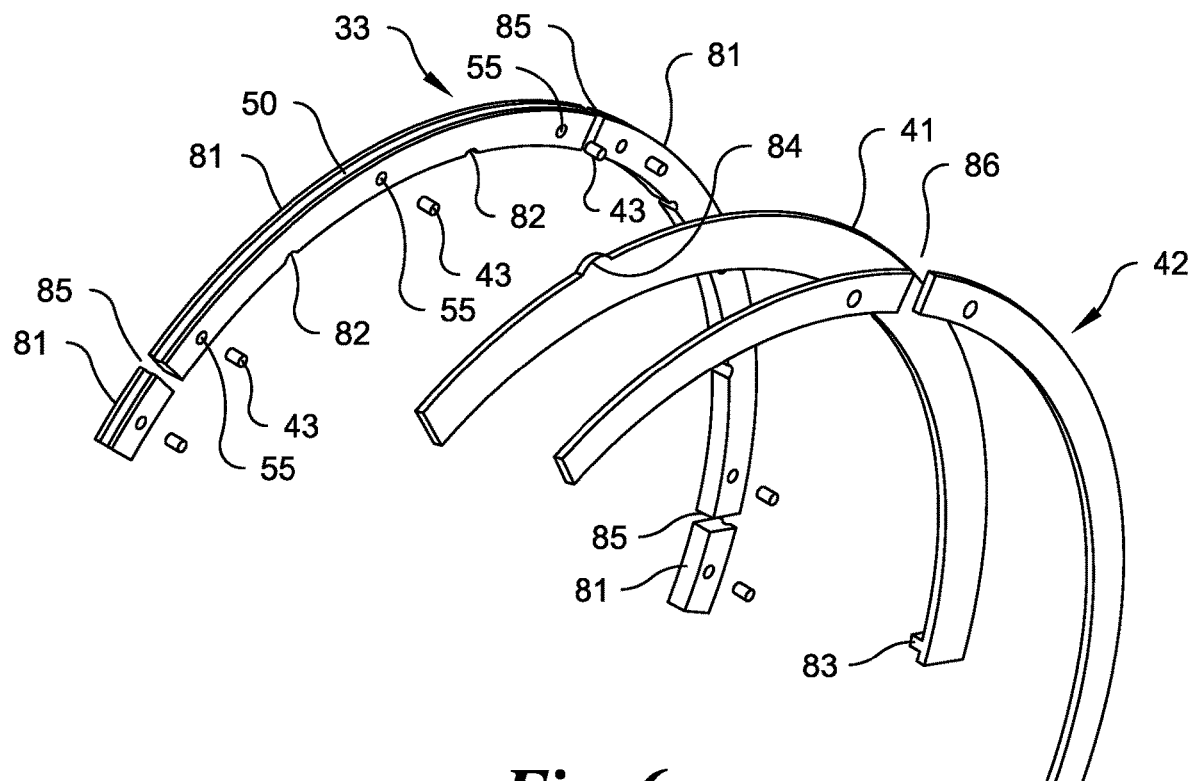
FIG. 6a is an exploded view illustrating a portion of each of the third sealing ring, a back ring, and a retaining ring in accordance with an embodiment of the invention.

Referring now to FIG. 6a, the third sealing ring 33 comprises at least two ring segments 81 disposed in an end-to-end arrangement forming a ring-shaped structure. The ends of adjoining ring segments 81 may include interlockable features, such as described in FIGS. 3a and 3b, at each joint 85. In preferred embodiments, the joints 85 along the third sealing ring 33 are offset from the joints 87 along the primary sealing ring 31 to minimize leakage across the circumferential seal assembly 30.

Referring again to FIG. 6a, each ring segment 81 may include one or more pockets 55 along a face adjacent to the back plate 41. The pocket 55 accepts the compression spring 43 so that a portion of the compression spring 43 partially extends from the pocket 55. Each compression spring 43 biases the third sealing ring 33 onto the primary sealing ring 31 and biases the back plate 41 onto the retaining ring 42 as described in FIG. 2.

Referring now to FIGS. 6a and 2, each ring segment 81 has one or more bore grooves 82. The bore groove 82 traverses the ring segment 81 at the inner radial surface thereof. The bore groove 82 permits fluid originating in the higher pressure side 36 to traverse the ring segment 81 before entering the primary sealing ring 31. Fluid within the bore groove 82 may oppose the inward force applied by the garter spring 39 along the spring groove 50 thereby reducing the resultant load force between the third sealing ring 33 and the radial sealing surface 45 or separating the third sealing ring 33 from the radial sealing surface 45.

Referring again to FIGS. 6a and 2, the back plate 41 is a ring-shaped element disposed between the third sealing ring 33 and the retaining ring 42. The back plate 41 is arranged to permit indirect contact with the third sealing ring 33 via the compression springs 43 and direct contact with the retaining ring 42. However, it is understood in some embodiments that the third sealing ring 33 may translate within the circumferential seal assembly 30 so as to compress the compression springs 43 with or without contacting the back plate 41.

Figure 6B:
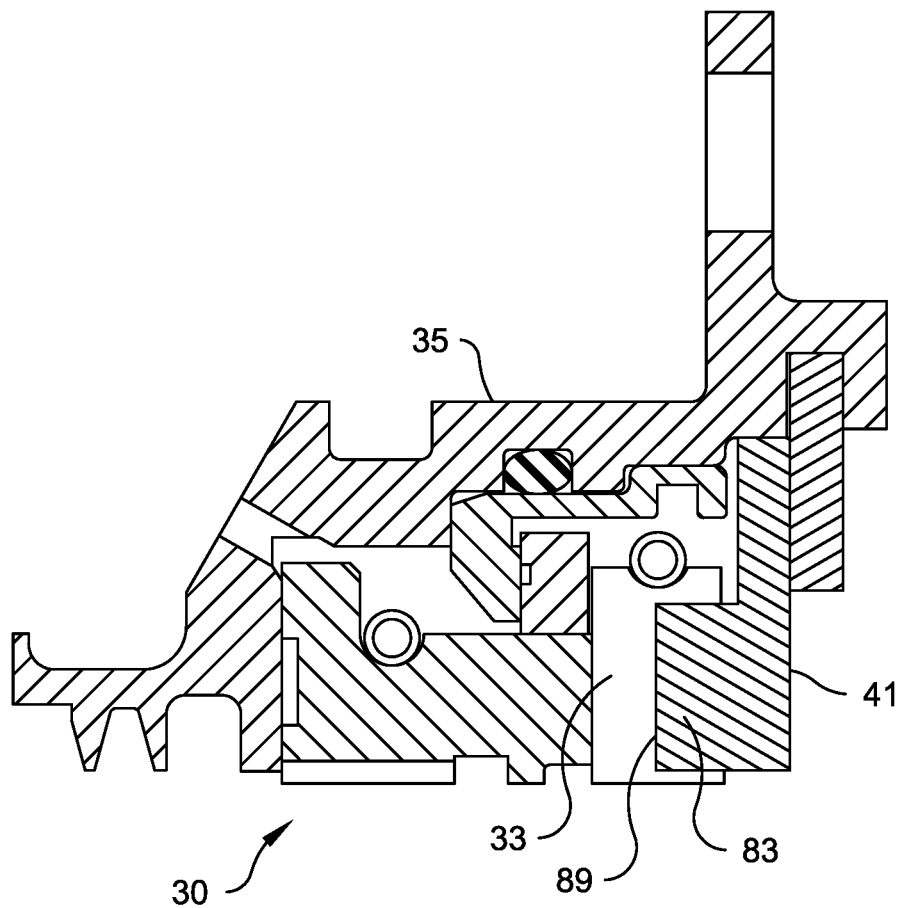
FIG. 6b is an enlarged cross-section view illustrating engagement between the anti-rotation tab along the back plate and a slot along the third sealing ring at the gap between ring segments in accordance with an embodiment of the invention.

Referring now to FIGS. 6a, 6b and 2, the back plate 41 is preferred to not rotate with respect to the circumferential seal assembly 30 and the housing 35. The back plate 41 may include an anti-rotation tab 84 which extends radially outward therefrom. The anti-rotation tab 84 engages a complementary slot (not shown) along the housing 35 so as to prevent relative rotation between the back plate 41 and the circumferential seal assembly 30. The back plate 41 may also include an anti-rotation tab 83 which extends axially from a face adjacent to the third sealing ring 33. The anti-rotation tab 83 may engage a slot 89 or the like at a gap between two adjoining ring segments 81 along the third sealing ring 33 to prevent relative rotation between the third sealing ring 33 and the back plate 41.

Referring again to FIGS. 6a and 2, the retaining ring 42 is a ring-shaped element with an end gap 86. The retaining ring 42 should be sufficiently flexible so that the opening at the end gap 86 may be closed thereby reducing the outer diameter of the retaining ring 42 for assembly onto the groove 26. The retaining ring 42 should also be sufficiently resilient permitting the end gap 86 to return its original shape when compressive forces are removed so that the retaining ring 42 properly seats onto the groove 26.

Figure 7:
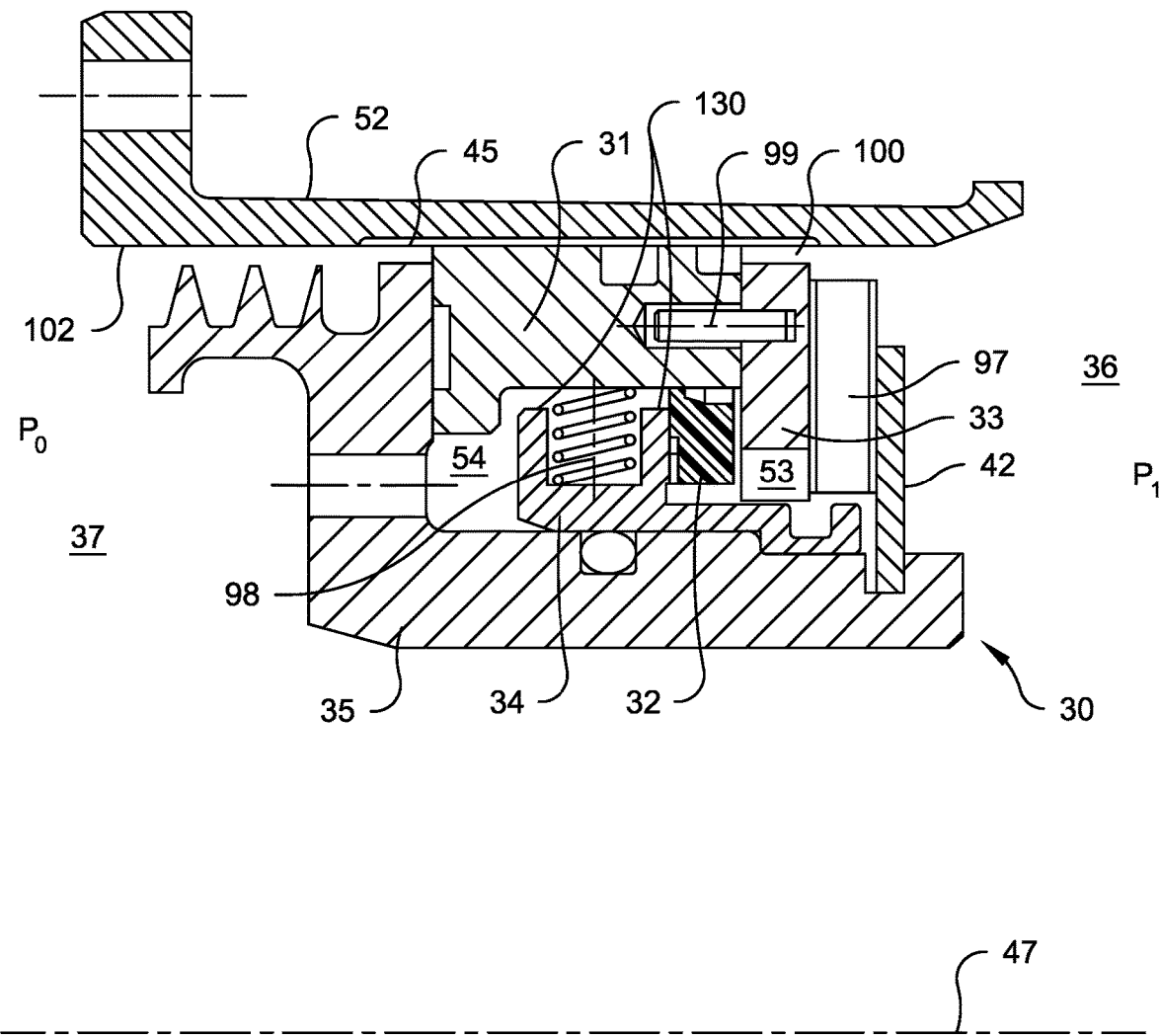
FIG. 7 is an enlarged cross-section view illustrating an improved circumferential seal assembly configured to sealingly engage an inner circumferential surface of a rotatable element whereby a plurality of springs directly contact both a primary sealing ring within the rotatable element and an insert secured to a housing about the sealing assembly so that the springs bias the primary sealing ring in the direction of the inner circumferential surface in accordance with an embodiment of the invention.

Referring now to FIG. 7, the circumferential seal assembly 30 is shown disposed within a rotatable element 52 rotatable about a rotational axis 47. In this embodiment, the rotatable element 52 is disposed about the circumferential seal assembly 30 so that at least the primary sealing ring 31 sealingly engages the inner circumferential surface 102 of the rotatable element 52 along a region referred to as the radial sealing surface 45 between a higher pressure side 36 and a lower pressure side 37. The insert 34 includes an outward flange 130 configured to extend toward but not contact the primary sealing ring 31.

Referring again to FIG. 7, one or more compression springs 98 may be disposed between each seal segment of the primary sealing ring 31 and the insert 34. One end of a compression spring 98 may be recessed within the insert 34 so that a second end of the compression spring 98 extends therefrom. The second end contacts the primary sealing ring 31 thereby communicating a biasing force onto each segment in the direction of the rotatable element 52. In this embodiment, the compression springs 98 push the segments comprising the primary sealing ring 31 outward so that the primary sealing ring 31 favors expansion rather than contraction. The primary sealing ring 31, the second sealing ring 32, the third sealing ring 33, and the insert 34 cooperate to define the first cavity 53 and the second cavity 54, as otherwise described herein.

Referring again to FIG. 7, the third sealing ring 33 in some embodiments may facilitate elimination of the back plate 41. The third sealing ring 33 may be a ring-shaped, metal element with an inward face that sealingly engages the primary sealing ring 31 and the second sealing ring 32. A spring 97 may contact the outward face of the third sealing ring 33. By way of example, the spring 97 may be a wave spring which contacts at one end the third sealing ring 33 and at another end the retaining ring 42. The retaining ring 42 is secured to the housing 35 as described herein thereby allowing the spring 97 to push or bias the third sealing ring 33 into engagement with the primary sealing ring 31.

Referring again to FIG. 7, optional retaining pins 99 may extend at one end into the primary sealing ring 31 and at another end into the third sealing ring 33 about the interface therebetween. During assembly, the compression springs 98 are seated onto the insert 34 and segments comprising the primary sealing ring 31 are placed about the compression springs 98. A compressive force is applied onto the compression springs 98 via the sealing segments so as to properly align the segments with the retaining pins 99. The retaining pins 99 engage cavities along the sealing segments so as to allow the retaining pins 99 to hold the segments in place. Optional anti-rotation paddle pins (not shown) could be pressed into the seal housing 35 adjacent to the sealing face and aligned to engage the primary sealing ring 31. Both retaining pins 99 and anti-rotation pins should permit the primary sealing ring 35 to expand and contract as required to ensure proper sealing along the radial sealing surface 45.

Referring again to FIG. 7, the third sealing ring 33 is disposed about the rotatable element 52 with an annular gap 100 therebetween. This arrangement is advantageous in that it avoids heating and wear along the outer surface of the third sealing ring 33 and along the inner circumferential surface 102. However, it is understood that an annular gap 100 may not be required in this and other embodiments of the invention thereby permitting the third sealing ring 33 to contact the rotatable element 52. By way of examples, a primary sealing ring 31 with tongue/socket joints may be used with a third sealing ring 33 with or without an annular gap 100, whereas a primary sealing ring 31 with radially overlapping joints would permit too much fluid to traverse the circumferential seal assembly 30 thereby requiring contact between the third sealing ring 33 and a rotatable element 52 along the radial sealing surface 45. Contacting arrangements may permit the third sealing ring 33 to be composed of carbon or other material(s) suitable for contact sealing.

Figure 8:
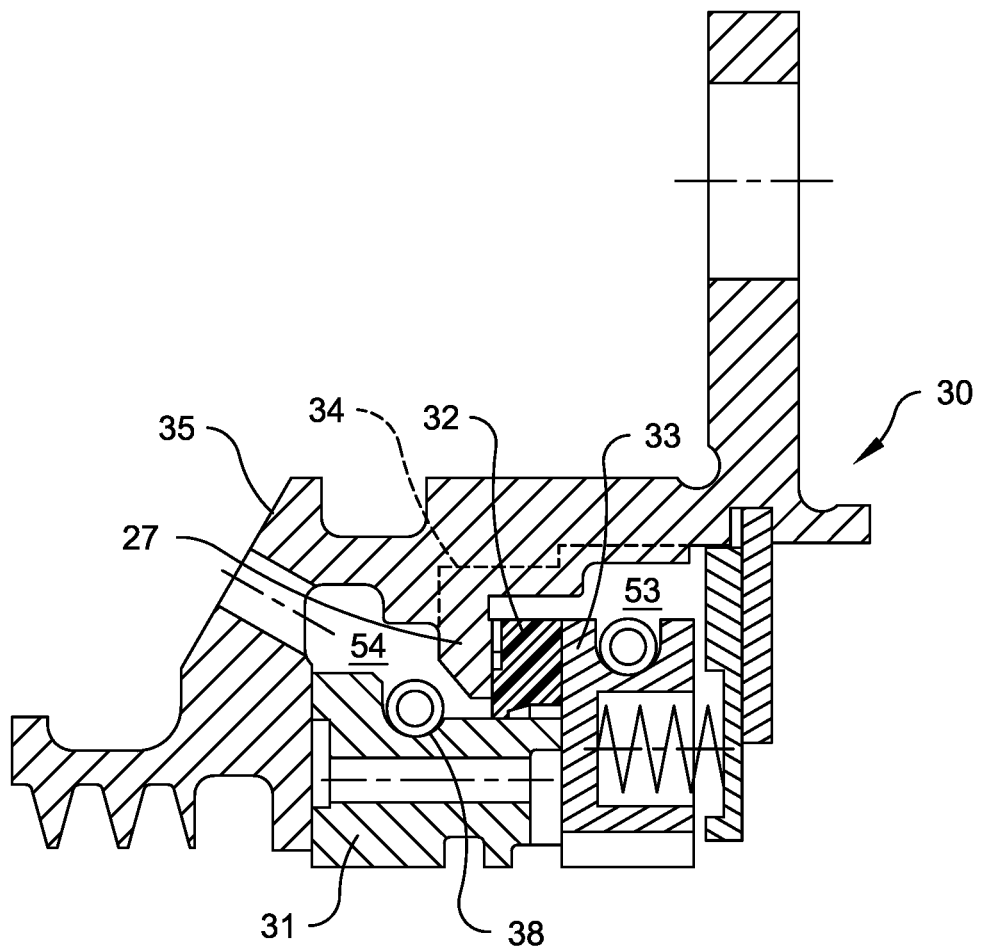
FIG. 8 is an enlarged cross-section view illustrating an insert geometry shown integral with the housing in accordance with an embodiment of the invention.

Referring now to FIG. 8, the insert 34 in some embodiments may be integral with the housing 35 rather than a separate component from the housing 35. In these embodiments, the insert 34 may be a part of the housing 35 or fixed to the housing 35 so as to be non-separable therefrom. In the former embodiments, the insert 34 may be directly formed onto the housing 35. In the latter embodiments, the insert 34 may be fabricated separate from the housing 35 and then secured thereto via a weld or other methods understood in the art. The inward flange 27 extends toward the primary sealing ring 31 and cooperates with the primary sealing ring 31, the second sealing ring 32, and the third sealing ring 33 to define the first cavity 53 and the second cavity 54, as otherwise described herein.

Referring again to FIG. 8, the insert 34 may complicate assembly of the circumferential seal assembly 30 when the inner diameter of the inward flange 27 is smaller than the outer diameter of the primary sealing ring 31. In these embodiments, the primary sealing ring 31 is assembled onto the housing 35 by inserting less than all segments of the primary sealing ring 31 into the housing 35. The garter spring 38 is placed about the portion of the primary sealing ring 31 residing within the housing 35. The remaining segment(s) of the primary sealing ring 31 are then inserted into housing 35 and the garter spring 38 is expanded so as to accept each segment now properly positioned to complete the primary sealing ring 31. Thereafter, the garter spring 38 is released so as to contract onto all seal segments thereby maintaining the ring shape of the primary sealing ring 31.

Figure 9:
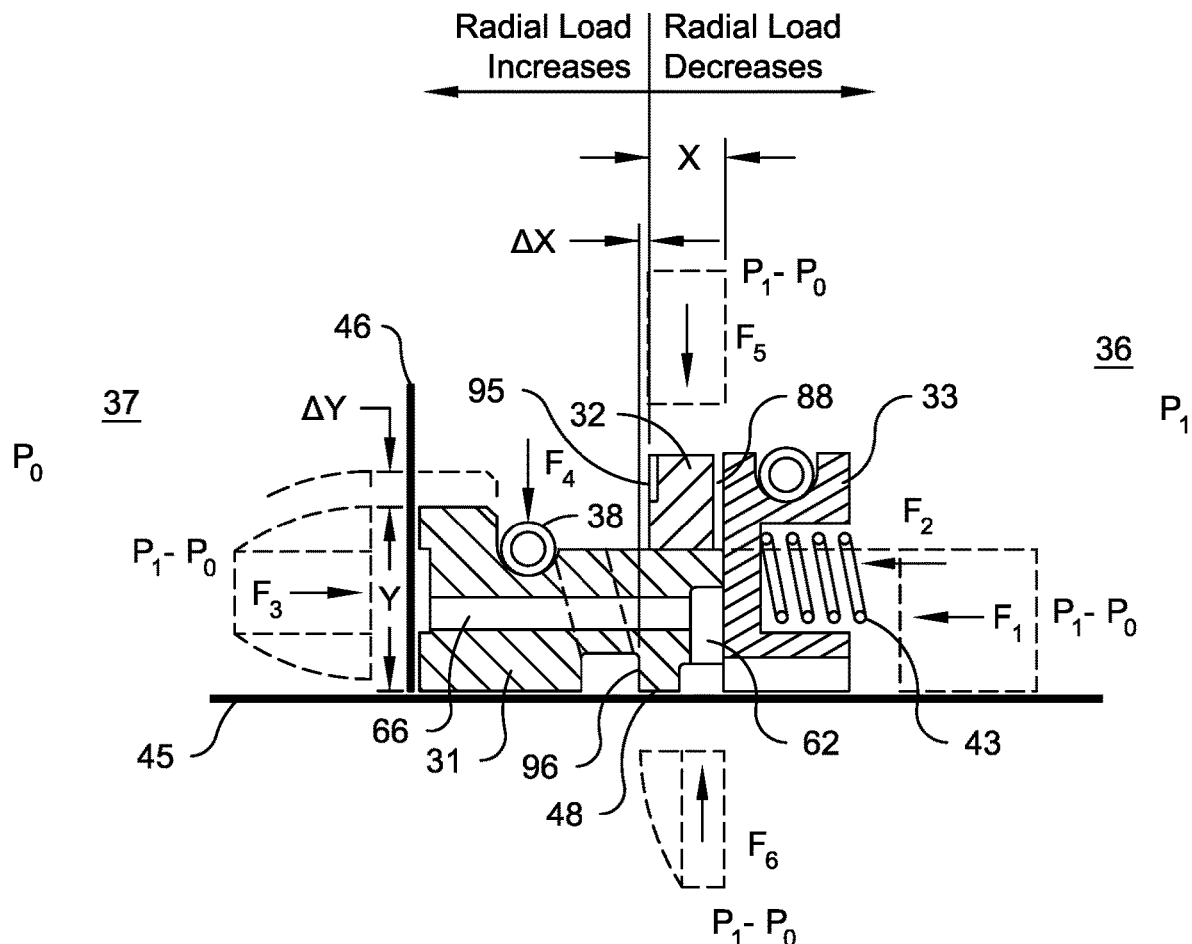
FIG. 9 is an enlarged cross-section view illustrating pressures and resultant forces communicated onto a primary sealing ring including a first channel and a vent channel in accordance with a radial contacting embodiment of the invention.

Referring now to FIGS. 9 and 2, pressures and pressure forces applied by fluid originating at the higher pressure side 36 are illustrated along a primary sealing ring 31 that sealingly contacts the radial sealing surface 45 and the face sealing surface 46. The pressure loading in FIG. 9 is generally understood to be the pressure differential across the circumferential seal assembly 30 ($P_1-P_0$) with applicable decay due to leakage where $P_1$ is the pressure within the higher pressure side 36 and $P_0$ is the pressure within the lower pressure side 37.

Referring again to FIGS. 9 and 2, the resultant force load at the radial sealing surface 45 is equal to the total of the spring force $F_4$ and the inward radial pressure force $F_5$ less the outward radial pressure force $F_6$ for a primary sealing ring 31 designed to contact a radial sealing surface 45. The spring force $F_4$ is applied onto the primary sealing ring 31 via the garter spring 38. The inward radial pressure force $F_5$ is applied onto the primary sealing ring 31 by the second sealing ring 32 in response to fluid within the first cavity 53 acting on the second sealing ring 32. The outward radial pressure force $F_6$ is applied onto the primary sealing ring 31 by fluid at the vertical feed grooves 62 and the seal bore dams 48.

Referring again to FIGS. 9 and 2, the resultant force load at the face sealing surface 46 is equal to the total of the aft axial pressure force $F_1$ and the spring force $F_2$ less the forward axial pressure force $F_3$. The aft axial pressure force $F_1$ is applied onto the primary sealing ring 31 by the third sealing ring 33 in response to fluid within the gap 25 acting on the third sealing ring 33. The spring force $F_2$ is applied onto the primary sealing ring 31 via the compression springs 43. The forward axial pressure force $F_3$ is applied onto the primary sealing ring 31 by fluid communicated onto the face sealing surface 46 via the first channels 66.

Figure 10A:
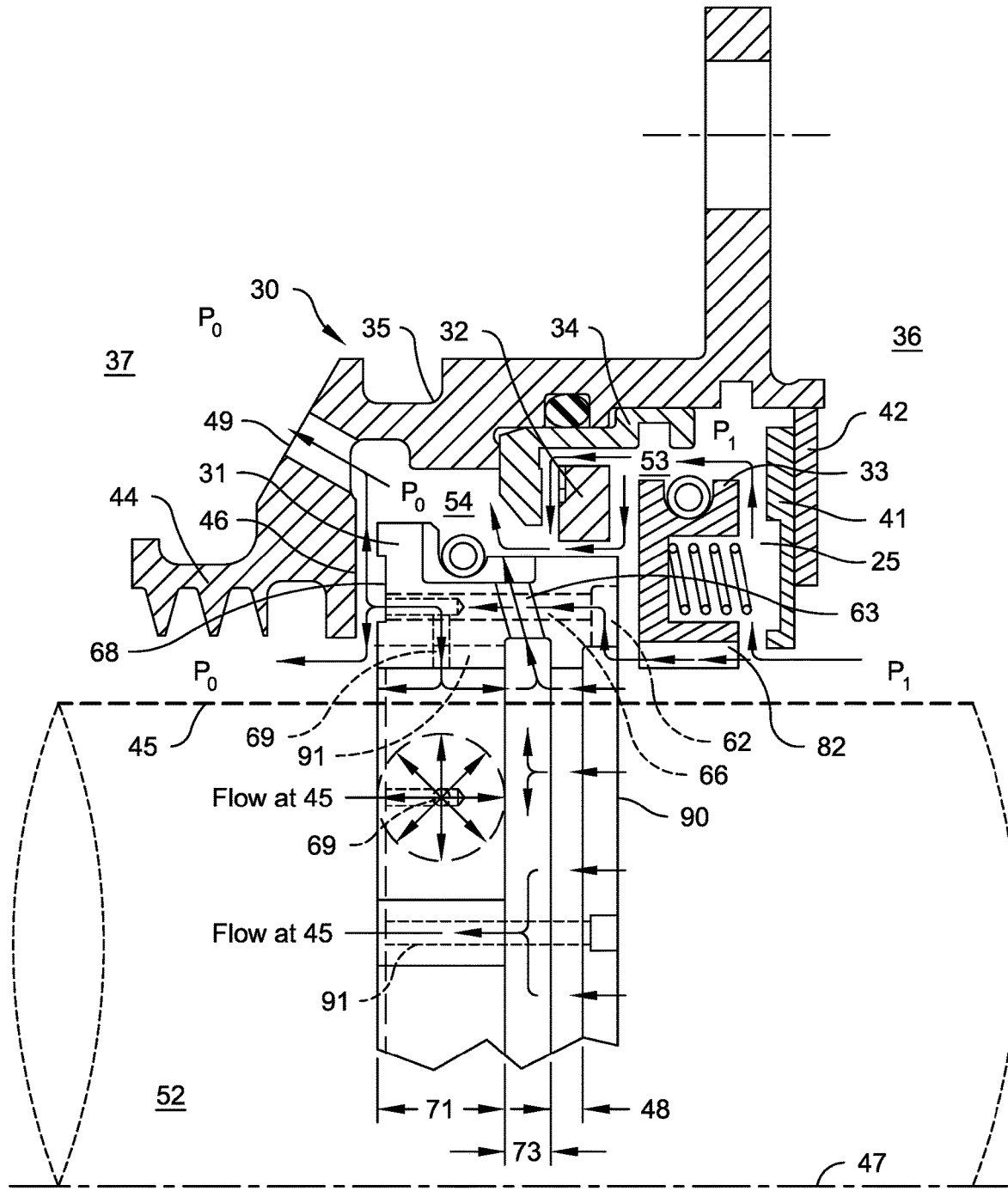
FIG. 10a is an upper cross-section view with lower side view illustrating flow across a circumferential seal assembly disposed between a higher pressure side and a lower pressure side whereby a primary sealing ring includes a first channel, a second channel or an optional bearing slot, and a vent channel in accordance with a hydrostatic embodiment of the invention.

Referring now to FIG. 10a, exemplary flow paths are shown through a circumferential seal assembly 30 whereby fluid originating at a higher pressure side 36 at a higher pressure $P_1$ is utilized for sealing purposes before the same fluid exits the circumferential seal assembly 30 and enters a lower pressure side 37 at a lower pressure $P_0$. It understood that fluid communicated onto the face sealing surface 46 and the radial sealing surface 45 may form a thin-film layer. The thin-film layer may enhance sealing function by the primary sealing ring 31 disposed about the rotatable element 52 along a rotational axis 47 and reduce pressure forces along the primary sealing ring 31 at the face sealing surface 46 and the radial sealing surface 45.

Referring again to FIG. 10a, fluid from the higher pressure side 36 passes through an annular opening between the retaining ring 42 and the rotatable element 52 and another annular opening between the back plate 41 and the rotatable element 52. The fluid then passes along the gap 25 between the back plate 41 and the third sealing ring 33 before entering the first cavity 53. In some embodiments, fluid may then partially or completely traverse one or more interfaces between the second sealing ring 32 and the insert 34, the third sealing ring 33 and the primary sealing ring 31 before entering the second cavity 54. It is understood that the flow rate, if any, between the first cavity 53 and the second cavity 54 is substantially less than the flow rate across other portions of the circumferential seal assembly 30.

Referring again to FIG. 10a, fluid also passes across the third sealing ring 33 via the bore grooves 82 before entering the vertical feed grooves 62. A portion of the fluid may pass under the seal bore dam 48 and thereafter enter the annular groove 73. Fluid within the vertical feed grooves 62 then enters and passes through the first channels 66 before exiting into the pocket 68. A portion of the fluid within the pocket 68 may then separate and flow across the face sealing surface 46 thereafter entering the second cavity 54 and the lower pressure side 37 via an annular opening adjacent to the windback 44. Another portion of the fluid within the pocket 68 may then enter the second channels 69 before exiting the primary sealing ring 31 along the pads 71. Fluid along the pads 71 may then separate and flow between the bore surface 90 along the primary sealing ring 31 and the radial sealing surface 45 before either entering the annular groove 73 or passing into the lower pressure side 37 adjacent to the windback 44. In some embodiments, fluid may be communicated via the second channels 69 into the bore grooves 70 along the seal segments 56 and/or optional bearing slots 91 along the bore surface 90.

Referring again to FIG. 10a, fluid within the annular groove 73 then passes into the vent channels 63 before exiting into the second cavity 54. Fluid within the second cavity 54 passes through the exhaust port(s) 49 along the housing 35 before entering the lower pressure side 37.

Figure 10B:
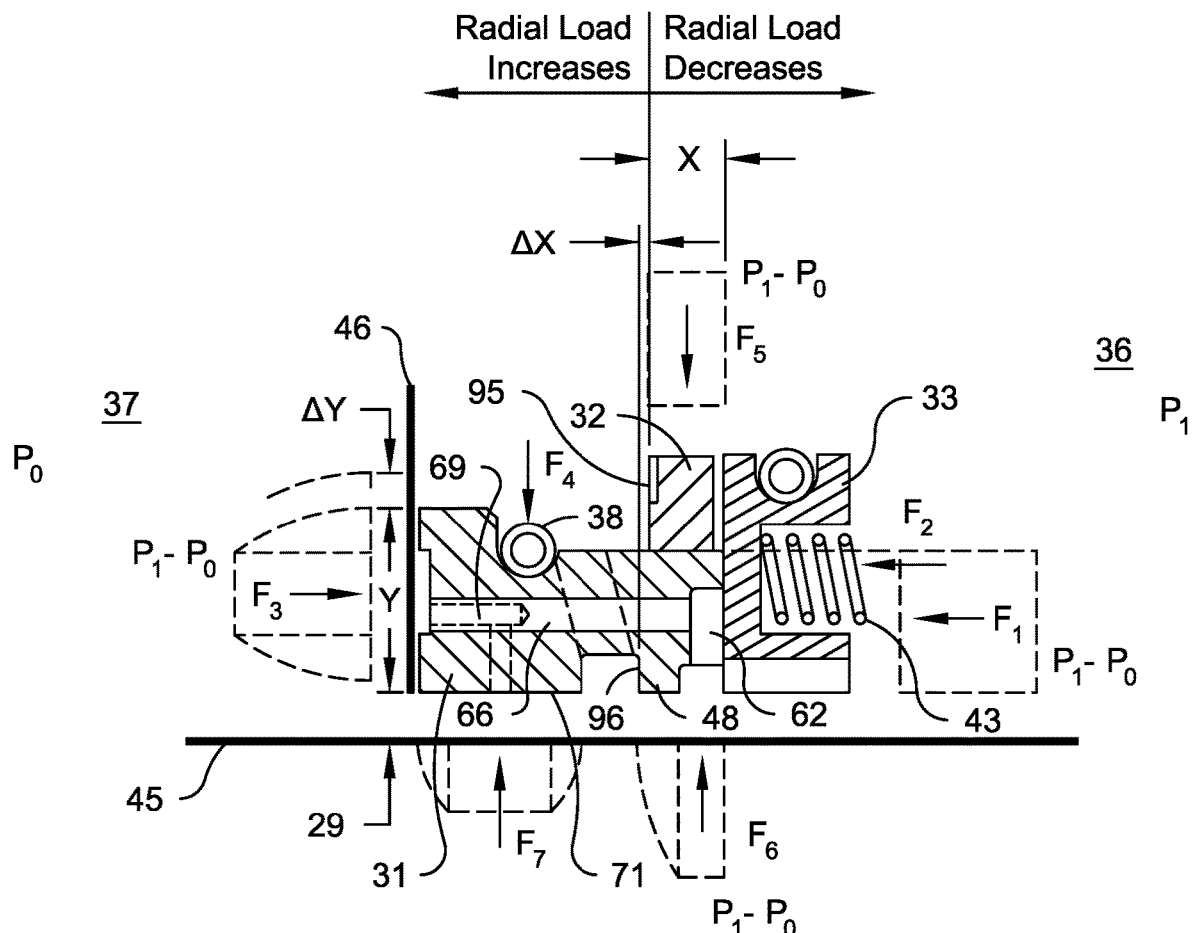
FIG. 10b is cross-section view illustrating pressures and resultant forces communicated onto the primary sealing ring including the first channel, the second channel, and the vent channel in accordance with a hydrostatic embodiment of the invention.

Referring now to FIGS. 10a, 10b and 2, pressures and pressure forces applied by fluid originating in the higher pressure side 36 are illustrated along a primary sealing ring 31 that sealingly engages the radial sealing surface 45 via a thin-film along the gap 29 and sealingly contacts the face sealing surface 46. The pressure loading in FIG. 10b is generally understood to be the pressure differential across the circumferential seal assembly 30 ($P_1 - P_0$) with applicable decay due to leakage where $P_1$ is the pressure within the higher pressure side 36 and $P_0$ is the pressure within the lower pressure side 37.

Referring again to FIGS. 10b, 10a and 2, the resultant force load at the radial sealing surface 45 is equal to the total of the spring force $F_4$ and the inward radial pressure force $F_5$ less the total of the outward radial pressure force $F_6$ and the outward radial pressure force $F_7$. The spring force $F_4$ is applied onto the primary sealing ring 31 via the garter spring 38. The inward radial pressure force $F_5$ is applied onto the primary sealing ring 31 by the second sealing ring 32 in response to fluid within the first cavity 53 acting on the second sealing ring 32. The outward radial pressure force $F_6$ is applied onto the primary sealing ring 31 by fluid at the vertical feed grooves 62 and the seal bore dams 48. The outward radial pressure force $F_7$ is applied onto the primary sealing ring 31 by fluid hydrostatically communicated at the pad 71 via the second channels 69.

Referring again to FIGS. 10b, 10a and 2, the resultant force load at the face sealing surface 46 is equal to the total of the aft axial pressure force $F_1$ and the spring force $F_2$ less the forward axial pressure force $F_3$. The aft axial pressure force $F_1$ is applied onto the primary sealing ring 31 by the third sealing ring 33 in response to fluid within the gap 25 acting on the third sealing ring 33. The spring force $F_2$ is applied onto the primary sealing ring 31 via the compression springs 43. The forward axial pressure force $F_3$ is applied onto the primary sealing ring 31 by fluid communicated onto the face sealing surface 46 via the first channels 66.

Figure 11A:
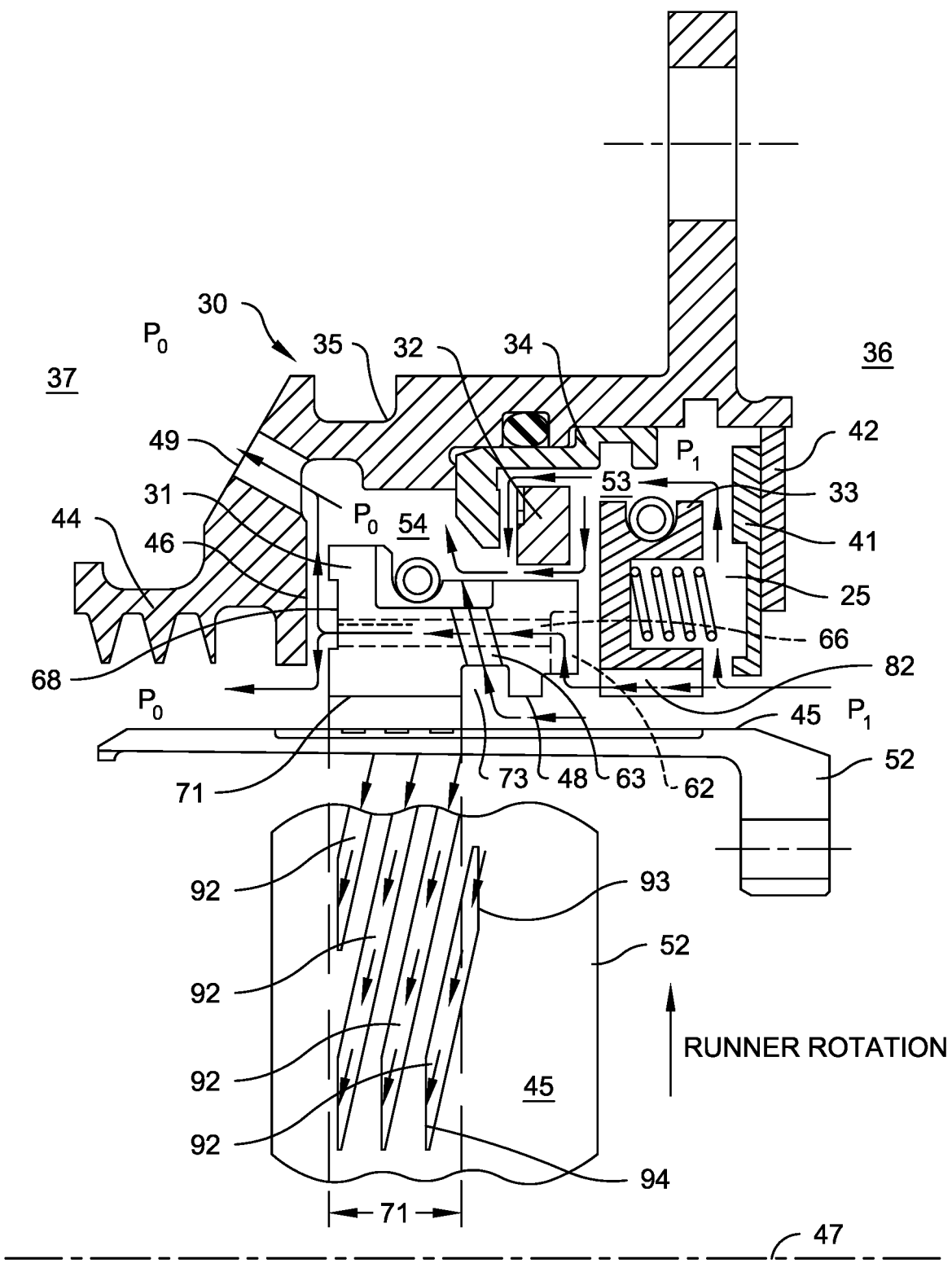
FIG. 11a is an upper cross-section view with lower side view illustrating flow across a circumferential seal assembly disposed between a higher pressure side and a lower pressure side whereby a primary sealing ring includes a first channel and a vent channel and a rotatable element includes a plurality of hydrodynamic grooves in accordance with a hydrodynamic embodiment of the invention.

Referring now to FIG. 11a, exemplary flow paths are shown through a circumferential seal assembly 30 whereby fluid originating at a higher pressure side 36 at a higher pressure $P_1$ is utilized for sealing purposes before the same fluid exits the circumferential seal assembly 30 and enters a lower pressure side 37 at a lower pressure $P_0$. It understood that fluid communicated onto the face sealing surface 46 and the radial sealing surface 45 may form a thin-film layer enhancing sealing function by the primary sealing ring 31 along the rotatable element 52, such as the runner disposed about a rotational axis 47 in FIG. 11a, and reducing pressure forces along the primary sealing ring 31 at the face sealing surface 46 and the radial sealing surface 45.

Referring again to FIG. 11a, fluid from the higher pressure side 36 passes through an annular opening between the retaining ring 42 and the rotatable element 52 and another annular opening between the back plate 41 and the rotatable element 52. The fluid then passes along the gap 25 between the back plate 41 and the third sealing ring 33 before entering the first cavity 53. In some embodiments, fluid may then partially or completely traverse one or more interfaces between the second sealing ring 32 and the insert 34, the third sealing ring 33 and the primary sealing ring 31 before entering the second cavity 54. It is understood that the flow rate, if any, between the first cavity 53 and the second cavity 54 is substantially less than the flow rate across other portions of the circumferential seal assembly 30.

Referring again to FIG. 11a, fluid also passes across the third sealing ring 33 via the bore grooves 82 before entering the vertical feed grooves 62. A portion of the fluid may pass under the seal bore dam 48 and before entering the annular groove 73. Fluid within the vertical feed grooves 62 then enters and passes through the first channels 66 before exiting into the pocket 68. The fluid within the pocket 68 may then separate and flow across the face sealing surface 46 thereafter entering the second cavity 54 and the lower pressure side 37 via an annular opening adjacent to the windback 44.

Referring again to FIG. 11a, the rotatable element 52 may include a plurality of hydrodynamic grooves 92 disposed along the radial sealing surface 45. A first end 93 of the hydrodynamic groove 92 communicates with fluid at the higher pressure side 36. The hydrodynamic groove 92 is oriented with respect to rotation of the rotatable element 52 so that fluid is captured at the first end 93 thereafter traveling along the hydrodynamic groove 92 with increasing pressure. The fluid is then redirected upward at a second end 94 of the hydrodynamic groove 92 onto the primary sealing ring 31, preferably at the end with the pad 71. Fluid along the pads 71 may flow into the lower pressure side 37 and/or the annular groove 73.

Referring again to FIG. 11a, fluid within the annular groove 73 then passes into the vent channels 63 before exiting into the second cavity 54. Fluid within the second cavity 54 passes through the exhaust port(s) 49 along the housing 35 before entering the lower pressure side 37.

Figure 11B:
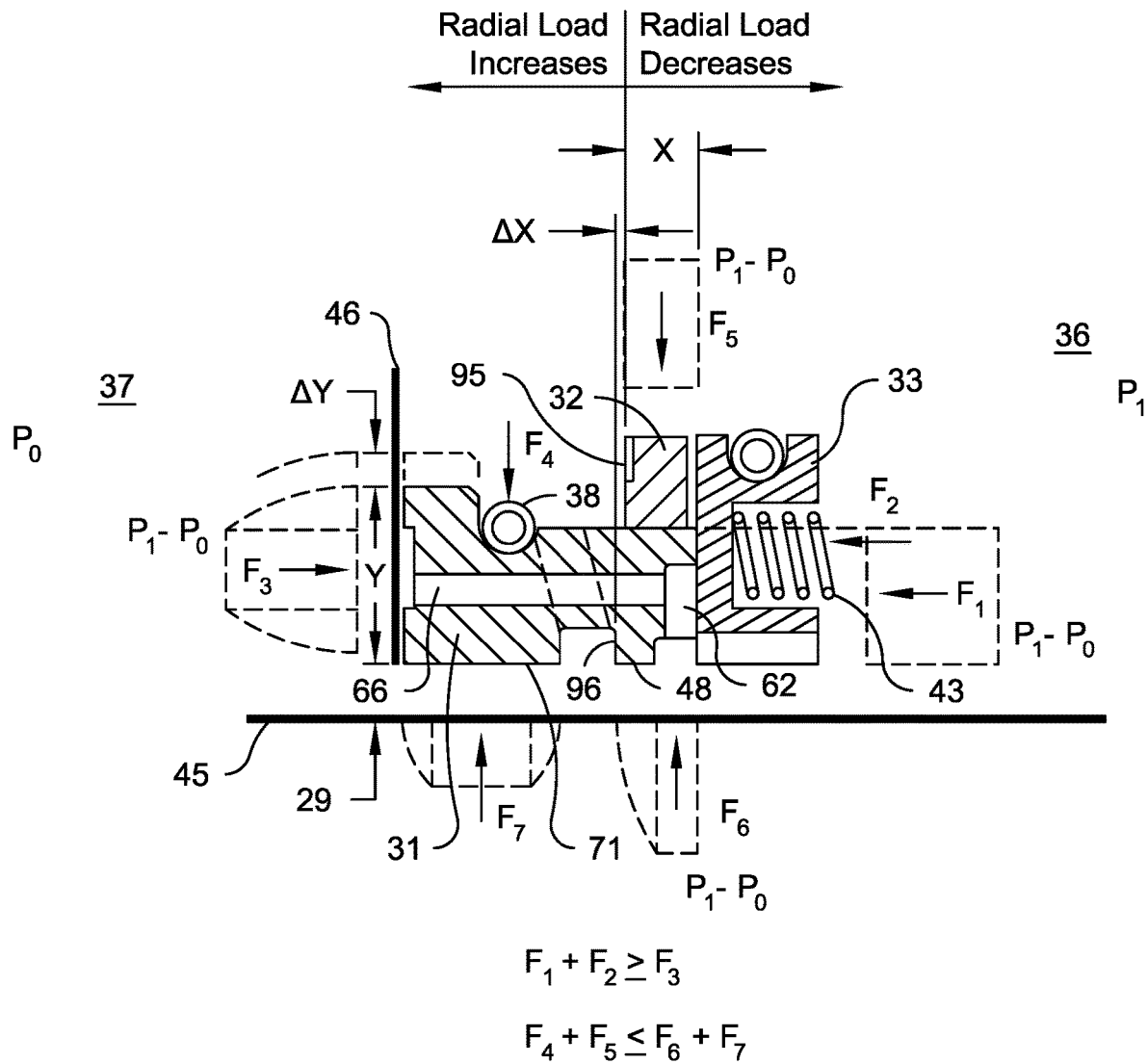
FIG. 11b is cross-section view illustrating pressures and resultant forces communicated onto the primary sealing ring including the first channel and the vent channel and the rotatable element includes hydrodynamic grooves in accordance with a hydrodynamic embodiment of the invention.

Referring now to FIGS. 11b, 11a and 2, pressures and pressure forces applied by fluid originating in the higher pressure side 36 are illustrated along a primary sealing ring 31 that sealingly engages the radial sealing surface 45 via a thin-film along the gap 29 and sealingly contacts the face sealing surface 46. The pressure loading in FIG. 11b is generally understood to be the pressure differential across the circumferential seal assembly 30 ($P_1-P_0$) with applicable decay due to leakage where $P_1$ is the pressure within the higher pressure side 36 and $P_0$ is the pressure within the lower pressure side 37.

Referring again to FIGS. 11b, 11a and 2, the resultant force load at the radial sealing surface 45 is equal to the total of the spring force $F_4$ and the inward radial pressure force $F_5$ less the total of the outward radial pressure force $F_6$ and the outward radial pressure force $F_7$. The spring force $F_4$ is applied onto the primary sealing ring 31 via the garter spring 38. The inward radial pressure force $F_5$ is applied onto the primary sealing ring 31 by the second sealing ring 32 in response to fluid within the first cavity 53 acting on the second sealing ring 32. The outward radial pressure force $F_6$ is applied onto the primary sealing ring 31 by fluid at the vertical feed grooves 62 and the seal bore dams 48. The outward radial pressure force $F_7$ is applied onto the primary sealing ring 31 by fluid hydrodynamically communicated at the pad 71 via the hydrodynamic grooves 92.

Referring again to FIGS. 11b, 11a and 2, the resultant force load at the face sealing surface 46 is equal to the total of the aft axial pressure force $F_1$ and the spring force $F_2$ less the forward axial pressure force $F_3$. The aft axial pressure force $F_1$ is applied onto the primary sealing ring 31 by the third sealing ring 33 in response to fluid within the gap 25 acting on the third sealing ring 33. The spring force $F_2$ is applied onto the primary sealing ring 31 via the compression springs 43. The forward axial pressure force $F_3$ is applied onto the primary sealing ring 31 by fluid communicated onto the face sealing surface 46 via the first channels 66.

Referring now to FIGS. 9, 10b and 11b, the resultant pressure force at the face sealing surface 46 is adjusted via changes to the radial height Y of the primary sealing ring 31. The resultant pressure force increases when the radial height Y is decreased by a radial adjustment ΔY causing a corresponding decrease to the forward axial pressure force $F_3$. The resultant pressure force decreases when the radial height Y is increased by a radial adjustment ΔY causing a corresponding increase to the forward axial pressure force $F_3$.

Figure 12A:
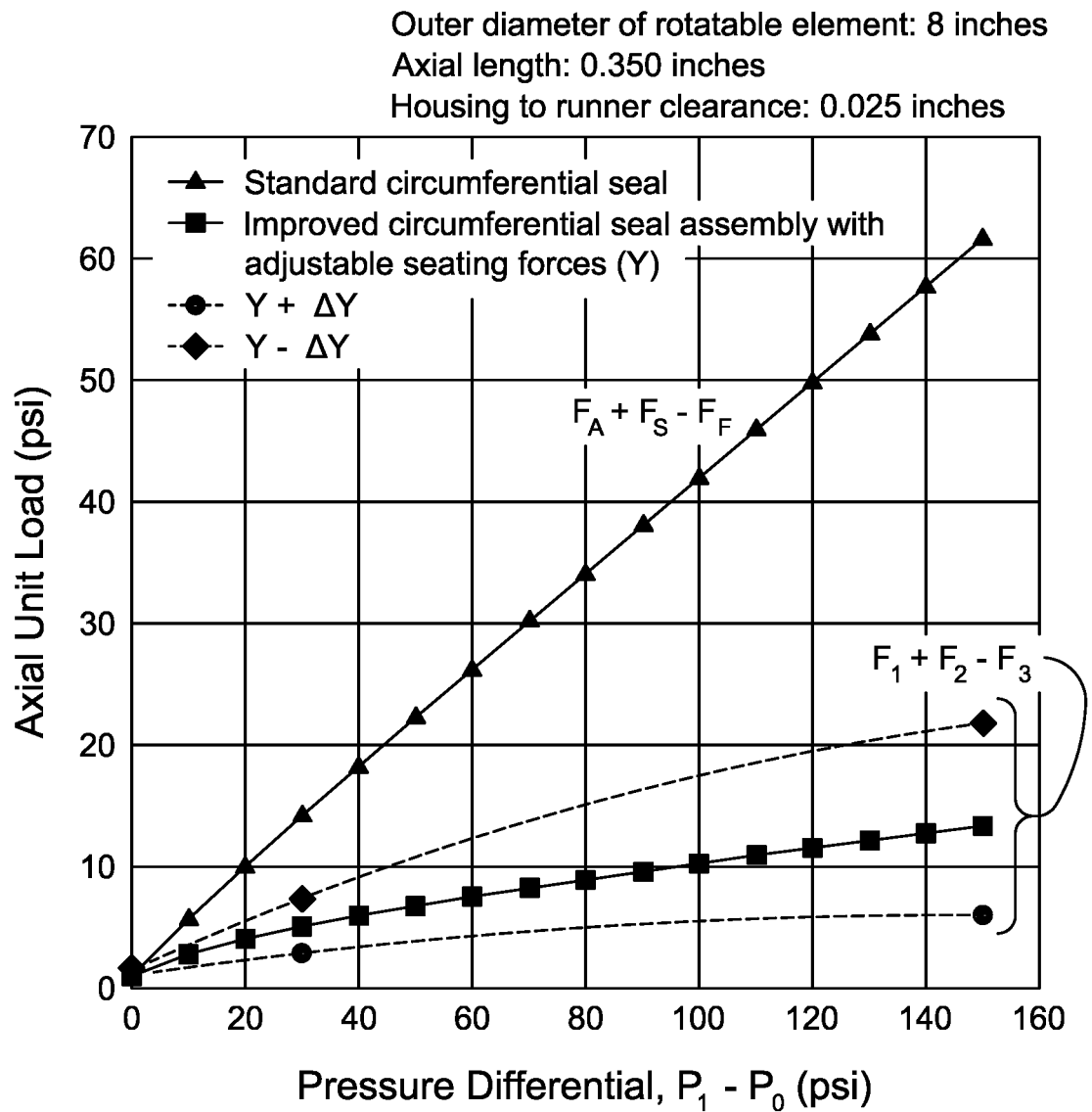
FIG. 12a is an exemplary plot illustrating axial load versus pressure differential for a contacting embodiment of the circumferential seal assembly of the present invention and a standard circumferential seal.

Referring now to FIG. 12a, the resultant pressure forces at the face sealing surface 46 are illustrated in exemplary form whereby axial unit load is plotted over a range of pressure differentials across a standard circumferential seal such as in FIG. 1 and an improved contacting circumferential seal such as in FIG. 2. The improved seal with a radial height Y significantly reduces the axial unit load in comparison to the standard seal whereby the reductions achievable by the improved seal are greater at higher pressure differentials. The curves for radial adjustments±ΔY within an exemplary range demonstrate that the reduction in the axial load profile does not sacrifice the adjustability required to optimize the circumferential seal assembly 30 for particular applications.

Referring again to FIGS. 9, 10b and 11b, the resultant pressure force at the radial sealing surface 45 is adjusted via changes to the relative position of the second sealing ring 32 with respect to the seal bore dam 48. Adjustments made to the second sealing ring 32 may require dimensional and positional adjustments to the insert 34 so as to maintain the proper sealing engagement therebetween.

Referring again to FIGS. 9, 10b and 11b, the magnitude of the resultant pressure force increases when the axial position of the second sealing ring 32 is adjusted toward the lower pressure side 37. The adjustment ΔX is implemented by reducing the axial distance between the second sealing ring 32 and the lower pressure side 37 so that the axial width X over which the inward radial pressure force $F_5$ acts is increased. In one example, the second sealing ring 32 may be physically moved toward the lower pressure side 37 without adjustment to the axial width of the second sealing ring 32.

Referring again to FIGS. 9, 10a and 10b, the magnitude of the resultant pressure force decreases when the axial position of the second sealing ring 32 is moved toward the higher pressure side 36. The adjustment ΔX is implemented by increasing the axial distance between the second sealing ring 32 and the lower pressure side 37 so that the axial width X over which the inward radial pressure force $F_5$ acts is decreased. In one example, the second sealing ring 32 may be physically moved toward the higher pressure side 36 without adjustment to the axial width of the second sealing ring 32.

Referring again to FIGS. 9, 10a and 10b, the face 95 of the second sealing ring 32 is either aligned with the face 96 of the seal bore dam 48 or closer to the higher pressure side 36 than the face 96 in preferred embodiments so that an adjustment ΔX to the second sealing ring 32 in the direction of the lower pressure side 37 decreases the axial distance between the faces 95, 96 and so that an adjustment ΔX in the direction of the higher pressure side 36 increases the axial distance between the faces 95, 96.

Figure 12B:
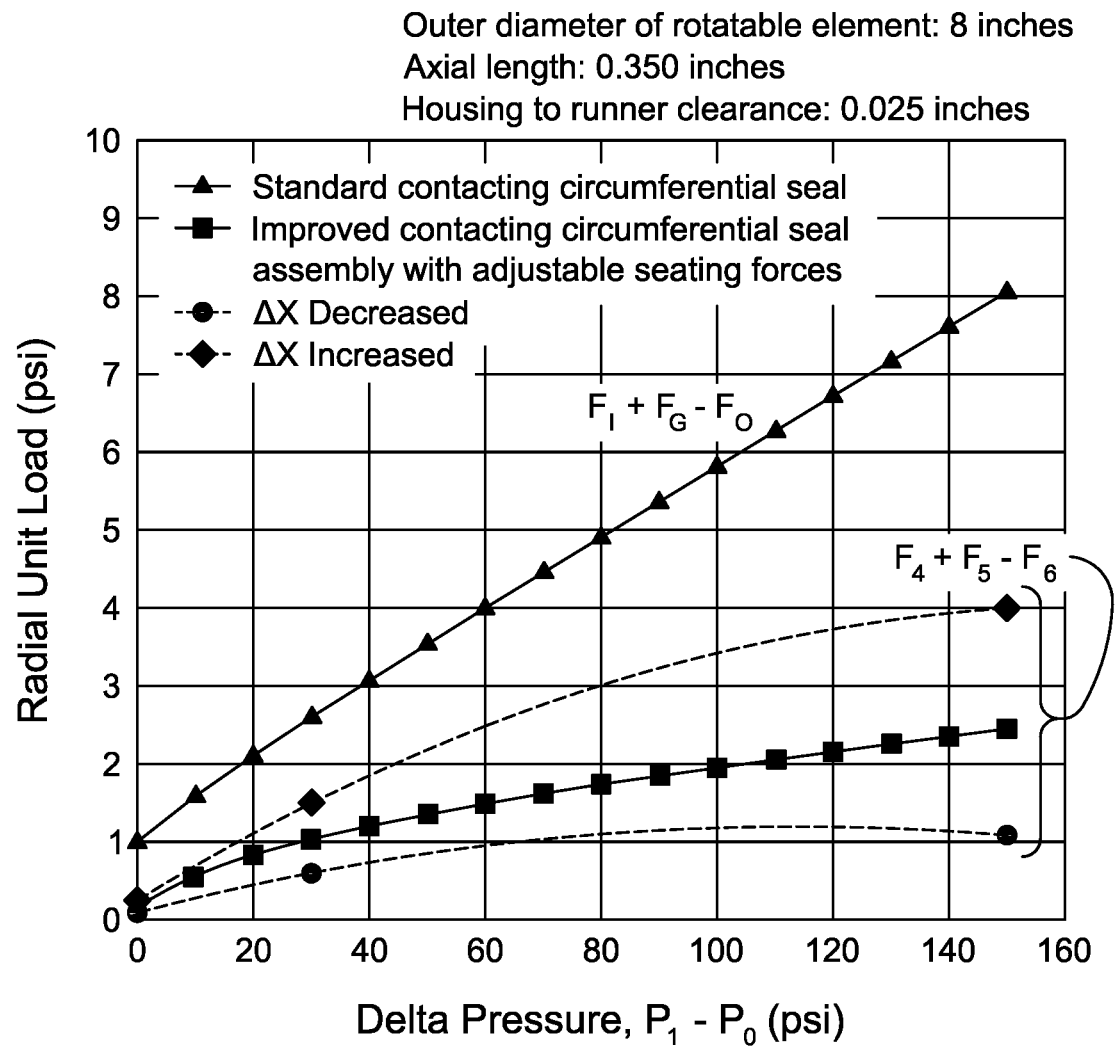
FIG. 12b is an exemplary plot illustrating radial load versus pressure differential for a contacting embodiment of the circumferential seal assembly of the present invention and a standard circumferential seal.

Referring now to FIG. 12b, the resultant pressure force at the radial sealing surface 45 is illustrated in exemplary form whereby radial unit load is plotted over a range of pressure differentials across a standard circumferential seal such as in FIG. 1 and an improved contacting circumferential seal such as in FIG. 2. The improved seal significantly reduces the radial unit load in comparison to the standard seal whereby the reductions achievable by the improved seal are greater at higher pressure differentials. The curves for adjustments ΔX within an exemplary range demonstrate that the reduction in the radial load profile does not sacrifice the adjustability required to optimize the circumferential seal assembly 30 for particular applications. It is understood from FIG. 12b that additional improvements are realized by inclusion of the hydrostatic lift in FIG. 10a and/or the hydrodynamic lift in FIG. 11a.

The invention may be used within a variety of applications wherein circumferential sealing is required about a rotating surface to prevent migration of a fluid from one compartment into another compartment. Specific non-limiting examples are a turbine engine or an industrial equipment wherein a seal assembly is disposed along a rotatable/translatable shaft or a runner between a compartment with a first fluid and a compartment with a second fluid whereby mixing of the fluids would be detrimental to function of the engine or the equipment.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A circumferential seal assembly for use between a higher pressure side and a lower pressure side comprising:
    (a) a primary sealing ring disposed between a housing and a rotatable element, said primary sealing ring sealingly engages both a face sealing surface along said housing and a radial sealing surface along said rotatable element, said primary sealing ring includes at least two seal segments;
    (b) an insert disposed between said primary sealing ring and said housing so that said insert directly contacts said housing, said insert includes an outward flange configured to extend toward but not contact said primary sealing ring;
    (c) a second sealing ring disposed within said primary sealing ring, said second sealing ring and said outward flange partially overlap so that said second sealing ring sealingly engages a face portion of said outward flange, said second sealing ring portion not overlapping said outward flange extends toward and sealingly engages a circumferential surface of said primary sealing ring; and
    (d) a third sealing ring which contacts and sealingly engages said primary sealing ring, said second sealing ring disposed between said outward flange and said third sealing ring, said third sealing ring includes at least two ring segments; wherein
        said insert, said second sealing ring, and said third sealing ring define a first cavity adjacent to said second sealing ring and said third sealing ring;
        said primary sealing ring, said second sealing ring, said outward flange, and said housing define a second cavity adjacent to said primary sealing ring;
        said outward flange and said second sealing ring cooperate to separate said first cavity from said second cavity.

2. The circumferential seal assembly of claim 1, wherein said rotatable element being a shaft.

3. The circumferential seal assembly of claim 1, wherein said rotatable element being a runner disposed along a shaft.

4. The circumferential seal assembly of claim 1, wherein said first cavity being at a higher pressure and said second cavity being at a lower pressure.

5. The circumferential seal assembly of claim 1, wherein a fluid traverses said radial sealing surface adjacent to said third sealing ring before entering said primary sealing ring.

6. The circumferential seal assembly of claim 1, wherein said housing includes at least one exhaust port which permits said fluid to exit said second cavity.

7. The circumferential seal assembly of claim 1, wherein a fluid originating from said higher pressure side traverses said first cavity and passes around said second sealing ring before entering said second cavity.

8. The circumferential seal assembly of claim 1, wherein said third sealing ring being biased in the direction of said primary sealing ring via a spring.

9. The circumferential seal assembly of claim 8, wherein said spring being a wave spring.

10. The circumferential seal assembly of claim 8, wherein an annular gap disposed between said third sealing ring and said rotatable element.

11. The circumferential seal assembly of claim 8, wherein said third sealing ring comprises a metal.

12. The circumferential seal assembly of claim 1, wherein a plurality of retaining pins extend at one end into said primary sealing ring and at another end into said third sealing ring.

13. The circumferential seal assembly of claim 1, wherein said primary sealing ring being biased outward in direction of said rotatable element via a plurality of springs.

14. The circumferential seal assembly of claim 13, wherein a plurality of retaining pins extends at one end into said primary sealing ring and at another end into said third sealing ring.

15. The circumferential seal assembly of claim 14, wherein said springs permit proper alignment of said seal segments of said primary sealing ring to accept said retaining pins.

16. The circumferential seal assembly of claim 1, where said insert being integral with said housing.

17. A circumferential seal assembly for use between a higher pressure side and a lower pressure side comprising:
    (a) a primary sealing ring disposed between a housing and a rotatable element, said primary sealing ring sealingly engages both a face sealing surface of said housing and a radial sealing surface of said rotatable element, said primary sealing ring includes at least two seal segments;
    (b) a ring-shaped insert disposed between said primary sealing ring and said housing, said ring-shaped insert one of either contacting said housing or being integral with said housing, a portion of said ring-shaped insert forming an outward flange extending toward but not contacting said primary sealing ring;
    (c) a second sealing ring positioned within said primary sealing ring, said second sealing ring sealingly engaging a portion of a face of said outward flange, said second sealing ring extending past an end of said outward flange so as to contact an inner circumferential surface of said primary sealing ring; and
    (d) a third sealing ring which contacts and sealingly engages said primary sealing ring opposite of sealing engagement with said housing, said second sealing ring being disposed between said outward flange and said third sealing ring; wherein
        said ring-shaped insert, said second sealing ring, and said third sealing ring define a first cavity adjacent to said second sealing ring and said third sealing ring;
        said primary sealing ring, said second sealing ring, said outward flange, and said housing define a second cavity adjacent to said primary sealing ring;
        said outward flange and said second sealing ring cooperate to separate said first cavity from said second cavity.

18. The circumferential seal assembly of claim 17, wherein said rotatable element being a shaft.

19. The circumferential seal assembly of claim 17, wherein said rotatable element being a runner disposed along a shaft.

20. The circumferential seal assembly of claim 17, wherein, in use, said first cavity is suitable to be at a higher pressure and said second cavity is suitable to be at a lower pressure.

21. The circumferential seal assembly of claim 17, wherein a fluid may traverse, in use, said radial sealing surface adjacent to said third sealing ring before said primary sealing ring.

22. The circumferential seal assembly of claim 17, wherein said housing includes at least one exhaust port.

23. The circumferential seal assembly of claim 17, wherein a fluid originating from said higher pressure side may traverse, in use, said first cavity and pass around said second sealing ring before entering said second cavity.

24. The circumferential seal assembly of claim 17, wherein said third sealing ring being biased in the direction of said primary sealing ring via a spring, said spring being disposed between and contacts said third sealing ring and a retaining ring secured to said housing.

25. The circumferential seal assembly of claim 24, wherein said spring being a wave spring.

26. The circumferential seal assembly of claim 24, wherein an annular gap being disposed between said third sealing ring and said rotatable element.

27. The circumferential seal assembly of claim 24, wherein said third sealing ring comprises a metal.

28. The circumferential seal assembly of claim 17, wherein said primary sealing ring being biased outward in direction of said rotatable element via a plurality of springs.

29. The circumferential seal assembly of claim 28, wherein a plurality of retaining pins extends at one end into said primary sealing ring and at another end into said third sealing ring.

30. The circumferential seal assembly of claim 29, wherein said springs permit proper alignment of said seal segments of said primary sealing ring to accept said retaining pins.

31. A circumferential seal assembly for use between a higher pressure side and a lower pressure side comprising:
（a) a primary sealing ring disposed within a housing along a rotatable element, said primary sealing ring sealingly engages both a face sealing surface along said housing and a radial sealing surface along said rotatable element, said primary sealing ring includes at least two seal segments;
(b) a ring-shaped insert secured within and one of either contacting said housing or being integral with said housing, a portion of said ring-shaped insert forming an inward flange extending toward but not contacting said primary sealing ring;
(c) a second sealing ring positioned about said primary sealing ring, said second sealing ring sealingly engaging a portion of a face of said inward flange, said second sealing ring extending below an end of said inward flange so as to contact an outer circumferential surface of said primary sealing ring; and
(d) a third sealing ring which contacts and sealingly engages said primary sealing ring opposite of sealing engagement with said housing, said second sealing ring being disposed between said inward flange and said third sealing ring; wherein
said ring-shaped insert, said second sealing ring, and said third sealing ring define a first cavity adjacent to said second sealing ring and said third sealing ring;
said primary sealing ring, said second sealing ring, said inward flange, and said housing define a second cavity adjacent to said primary sealing ring;
said inward flange and said second sealing ring cooperate to separate said first cavity from said second cavity.

32. The circumferential seal assembly of claim 31, wherein said rotatable element being a shaft.

33. The circumferential seal assembly of claim 31, wherein said rotatable element being a runner disposed along a shaft.

34. The circumferential seal assembly of claim 31, wherein, in use, said first cavity is suitable to be at a higher pressure and said second cavity is suitable to be at a lower pressure.

35. The circumferential seal assembly of claim 31, wherein said primary sealing ring includes a seal bore dam biased toward said third sealing ring, said seal bore dam sealingly engages said radial sealing surface.

36. The circumferential seal assembly of claim 31, wherein a fluid may traverse, in use, said radial sealing surface adjacent to said third sealing ring before entering said primary sealing ring.

37. The circumferential seal assembly of claim 31, wherein each said seal segment includes at least one vertical feed groove disposed along an inlet side and at least one first channel that traverses said seal segment between said inlet side and an outlet side, said vertical feed groove and said first channel permit a fluid originating from said higher pressure side to traverse said seal segment so as to impinge said face sealing surface.

38. The circumferential seal assembly of claim 37, wherein each said seal segment includes at least one pocket at said outlet side communicable with at least one said first channel.

39. The circumferential seal assembly of claim 38, wherein each said seal segment includes at least one second channel communicable at one end with said pocket, said second channel permits said fluid to reenter said seal segment for communication at another end of said second channel onto said radial sealing surface.

40. The circumferential seal assembly of claim 39, wherein a plurality of hydrodynamic grooves disposed along said radial sealing surface adjacent to said primary sealing ring, said hydrodynamic grooves redirect said fluid exiting said second channel onto said primary sealing ring.

41. The circumferential seal assembly of claim 39, wherein said seal segment includes at least one vent channel communicable at one end with said radial sealing surface and at another end with said second cavity, said vent channel permits said fluid to traverse said seal segment before entering said second cavity.

42. The circumferential seal assembly of claim 41, wherein said housing includes at least one exhaust port, said exhaust port permits said fluid to exit said second cavity.

43. The circumferential seal assembly of claim 37, wherein a plurality of hydrodynamic grooves disposed along said radial sealing surface adjacent to said primary sealing ring, said hydrodynamic grooves direct said fluid onto said primary sealing ring.

44. The circumferential seal assembly of claim 43, wherein said seal segment includes at least one vent channel communicable at one end with a gap interposed between said seal segment and said radial sealing surface and at another end with said second cavity, said vent channel permits said fluid to traverse said seal segment and enter said second cavity.

45. The circumferential seal assembly of claim 44, wherein said housing includes at least one exhaust port, said exhaust port permits said fluid to exit said second cavity.

46. The circumferential seal assembly of claim 31, wherein a gap being interposed between said second sealing ring and said third sealing ring.

47. The circumferential seal assembly of claim 31, wherein a fluid originating from said higher pressure side may traverse, in use, said first cavity and pass around said second sealing ring before entering said second cavity.

48. The circumferential seal assembly of claim 31, wherein said seal segment includes a vertical flange at one end of a horizontal flange, said vertical flange sealingly engages said face sealing surface.

49. The circumferential seal assembly of claim 31, wherein said radial sealing surface being disposed along an outer circumferential surface of said rotatable element.

\* \* \* \* \*